United States Patent
Itoh et al.

(10) Patent No.: US 10,628,696 B2
(45) Date of Patent: Apr. 21, 2020

(54) IMAGING DEVICE, OBJECT DETECTOR AND MOBILE DEVICE CONTROL SYSTEM

(71) Applicants: Izumi Itoh, Tokyo (JP); Akihiro Kawamura, Kanagawa (JP); Ken Shirasaki, Kanagawa (JP); Kenichi Ishizuka, Kanagawa (JP); Kenya Fujiwara, Kanagawa (JP); Hiroyuki Satoh, Kanagawa (JP); Shusaku Takasu, Kanagawa (JP)

(72) Inventors: Izumi Itoh, Tokyo (JP); Akihiro Kawamura, Kanagawa (JP); Ken Shirasaki, Kanagawa (JP); Kenichi Ishizuka, Kanagawa (JP); Kenya Fujiwara, Kanagawa (JP); Hiroyuki Satoh, Kanagawa (JP); Shusaku Takasu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 15/515,849

(22) PCT Filed: Nov. 20, 2015

(86) PCT No.: PCT/JP2015/005812
§ 371 (c)(1),
(2) Date: Mar. 30, 2017

(87) PCT Pub. No.: WO2016/084359
PCT Pub. Date: Jun. 2, 2016

(65) Prior Publication Data
US 2017/0270381 A1    Sep. 21, 2017

(30) Foreign Application Priority Data

Nov. 26, 2014 (JP) .................................. 2014-238793
Jan. 26, 2015 (JP) .................................. 2015-012169

(51) Int. Cl.
*G06K 9/20* (2006.01)
*G06K 9/00* (2006.01)
(Continued)

(52) U.S. Cl.
CPC .............. *G06K 9/209* (2013.01); *B60Q 1/143* (2013.01); *B60R 1/00* (2013.01); *B60R 11/04* (2013.01);
(Continued)

(58) Field of Classification Search
CPC .... G06K 9/209; G02B 27/0101; G02B 27/28; B06S 1/0844
(Continued)

(56) References Cited

U.S. PATENT DOCUMENTS

2004/0178760 A1* 9/2004 Kobayashi ............ B60S 1/0822
                                                                318/483
2013/0242404 A1* 9/2013 Kobayashi ......... G02B 27/0101
                                                                359/630
(Continued)

FOREIGN PATENT DOCUMENTS

JP    2003-315256    11/2003
JP    2012-8360      1/2012
(Continued)

OTHER PUBLICATIONS

Extended European Search Report dated Oct. 10, 2017 issued in corresponding European Application No. 15863353.7.
(Continued)

*Primary Examiner* — Joshua D Taylor
(74) *Attorney, Agent, or Firm* — Harness, Dickey and Pierce, P.L.C.

(57) ABSTRACT

An imaging device includes a reflection polarization prism having an incident surface on which illumination light emitted from a light emitter is incident and a transmission
(Continued)

surface that passes the illumination light entered the incident surface through one surface of a light-transmitting member, an imager including an image sensor having a first light-receiving portion that receives light from a predetermined imaging area transmitting the light-transmitting member and a second light-receiving portion adjacent to the first light-receiving portion that receives the illumination light reflected on an opposite surface to the one surface of the light-transmitting member, and an optical member that emits the light introduced from the predetermined imaging area to the first light-receiving portion and emits the illumination light reflected on the opposite surface of the light-transmitting member to the second light-receiving portion.

10 Claims, 11 Drawing Sheets

(51) Int. Cl.
| | | |
|---|---|---|
| B60Q 1/14 | (2006.01) | |
| B60R 1/00 | (2006.01) | |
| B60R 11/04 | (2006.01) | |
| B60S 1/08 | (2006.01) | |
| G02B 27/28 | (2006.01) | |
| H04N 5/225 | (2006.01) | |
| H04N 5/369 | (2011.01) | |
| B60R 11/00 | (2006.01) | |

(52) U.S. Cl.
CPC ............ *B60S 1/0844* (2013.01); *G02B 27/28* (2013.01); *G06K 9/00791* (2013.01); *G06K 9/00798* (2013.01); *G06K 9/2018* (2013.01); *H04N 5/2254* (2013.01); *H04N 5/2256* (2013.01); *H04N 5/3696* (2013.01); *B60Q 2300/42* (2013.01); *B60R 2011/0026* (2013.01); *B60R 2300/30* (2013.01)

(58) Field of Classification Search
USPC ......................................... 348/148; 382/103
See application file for complete search history.

(56) References Cited

U.S. PATENT DOCUMENTS

| | | |
|---|---|---|
| 2014/0029008 A1 | 1/2014 | Hirai et al. |
| 2014/0270532 A1 | 9/2014 | Sawaki et al. |
| 2014/0321709 A1* | 10/2014 | Kasahara ............... B60S 1/0844 382/103 |
| 2015/0054954 A1 | 2/2015 | Itoh et al. |
| 2015/0142263 A1 | 5/2015 | Hirai et al. |
| 2017/0190319 A1* | 7/2017 | Kim .......................... G01J 1/42 |

FOREIGN PATENT DOCUMENTS

| | | | |
|---|---|---|---|
| JP | 2013-190417 | 9/2013 | |
| JP | 2014-32174 | 2/2014 | |
| JP | 2014-44196 | 3/2014 | |
| WO | WO-2013065870 A1 * | 5/2013 | ............ B60S 1/0844 |
| WO | WO-2014/010713 A1 | 1/2014 | |
| WO | WO-2014/023307 A1 | 2/2014 | |

OTHER PUBLICATIONS

International Search Report dated Mar. 1, 2016 in PCT/JP2015/005812 filed on Nov. 20, 2015.

\* cited by examiner

IMAGING DEVICE, OBJECT DETECTOR AND MOBILE DEVICE CONTROL SYSTEM

PRIORITY CLAIM

The present application is based on and claims priority from each of Japanese Patent Application No. 2014-238793, filed on Nov. 26, 2014 and Japanese Patent Application No. 2015-012169, filed on Jan. 26, 2015, the disclosure of which is hereby incorporated by reference in its entirety.

TECHNICAL FIELD

The present invention relates to an imaging device, an object detector, and a mobile device control system.

BACKGROUND ART

An imaging device that images a front area of a vehicle by a part of an image sensor and images extraneous substance(s) such as rain drop adhered to a windshield of the vehicle by other portion of the image sensor is conventionally known.

A conventional imaging device is disclosed in, for example, Patent Literature 1. The imaging device images a front area of a vehicle where a white line or preceding vehicle on a road surface exists by a first light-receiving portion that occupies an upper portion of about ⅔ of an image sensor and images rain drop adhered onto an outer wall surface of a windshield of the vehicle by a second light-receiving portion that occupies a lower portion of about ⅓ of the image sensor. The imaging device includes a light emitter that emits illumination light and a reflection polarization prism (an illumination light guiding member) which is provided on an inner wall surface of the windshield. The reflection polarization prism transmits the illumination light and is configured to be incident the illumination light on the windshield and to receive reflection light on the reflection polarization prism with the second light-receiving portion of the image sensor. By using the reflection polarization prism, it is possible to be made incident the illumination light on the inner wall surface of the wind shield to satisfy a condition in which the illumination light is totally reflected on an area (non-adhesion area) where the rain drop is not adhered on the outer wall surface of the windshield.

The illumination light reflected on the non-adhesion area of the outer wall surface of the windshield enters the reflection polarization prism from the inner wall surface of the windshield and is emitted from an exit surface of the reflection polarization prism and received on the second light-receiving portion of the image sensor. On the other hand, in an area (rain drop adhesion area) where the rain drop is adhered on the outer wall surface of the windshield, the illumination light passes through the outer wall surface to an exterior of the vehicle. Accordingly, the illumination light reflected on the rain drop adhesion area of the outer wall surface of the windshield is not received on the second light-receiving portion of the image sensor. As a result, it is possible to obtain an image in which an image portion projecting the non-adhesion area has a high brightness and an image portion projecting the rain drop adhesion area has a low brightness, from image data corresponding to the second light-receiving portion of the image sensor. By a difference (contrast) between the images, the rain drop on the windshield is configured to be capable of detecting.

CITATION LIST

Patent Literature

PTL 1: JP 2014-32174A

SUMMARY OF INVENTION

Technical Problem

However, in the imaging device disclosed in JP 2014-32174A, the reflection polarization prism mounted on the inner wall surface of the windshield interrupts a part of light flux from the front area of the vehicle to the image sensor. More specifically, in regard to light flux focused on the lower portion (an area of the first light receiving portion close to the second light-receiving portion) of the first light-receiving portion of the image sensor by an imaging lens, of light flux from an imaging area, a portion of the light flux entered a lower portion of the imaging lens is interrupted by the reflection polarization prism. Therefore, a light-receiving quantity received on the lower portion of the first light-receiving portion of the image sensor is relatively smaller than that received on other portion of the first light-receiving portion of the image sensor. A light-receiving quantity interrupted by the reflection polarization prism becomes large as going to a lower side of the image sensor. Consequently, in an image corresponding to the first light-receiving portion of the image sensor, the brightness becomes low as going to a lower side in a lower portion of the image. This causes a problem reducing accuracy in post-processing (vehicle detection processing and so on) subsequent to the processing using the image.

Solution to Problem

An object of the present invention is to provide an imaging device resolving the foregoing problem of the conventional imaging device, an object detector using the imaging device, and a mobile device control system using the object detector.

To accomplish the above object, an imaging device according to one embodiment of the present invention includes a light emitter that irradiates a light-transmitting member with illumination light from one surface of the light-transmitting member, an illumination light guiding member including an incident surface where the illumination light emitted from the light emitter is entered and a transmission surface that is disposed in contact with the one surface of the light-transmitting member and passes the illumination light introduced from the incident surface through the one surface of the light-transmitting member, an imager that receives light from a predetermined imaging area that transmits the light-transmitting member with a first light-receiving portion of an image sensor to emit image data of the imaging area and receives the illumination light reflected on an opposite surface to the one surface with a second light-receiving portion of the image sensor adjacent to the first light-receiving portion to emit image data of the light-transmitting member, and an optical member that emits light introduced from the predetermined imaging area toward the first light-receiving portion of the image sensor and emits the illumination light reflected on the opposite surface of the light-transmitting member toward the second light-receiving portion of the image sensor.

Advantageous Effects of Invention

According to the foregoing configuration, an imaging device using an illumination light guiding member or reflection polarization prism, a light-receiving quantity received on an area of a first light-receiving portion close to a second light-receiving portion of an image sensor can be prevented from being relatively reduced.

DESCRIPTION OF EMBODIMENTS

One embodiment in which an imaging device according to the present invention is applied to a vehicle-mounted device control system as a mobile device control system that controls a target device installed on a vehicle such as an automobile which is a movable body will be described hereinafter. The imaging device according to the present invention is not limited to the vehicle-mounted device control system and is applicable to other system and so on employing an object detection device that detects a detection object based on image data imaged by the imaging device.

Figure 1:
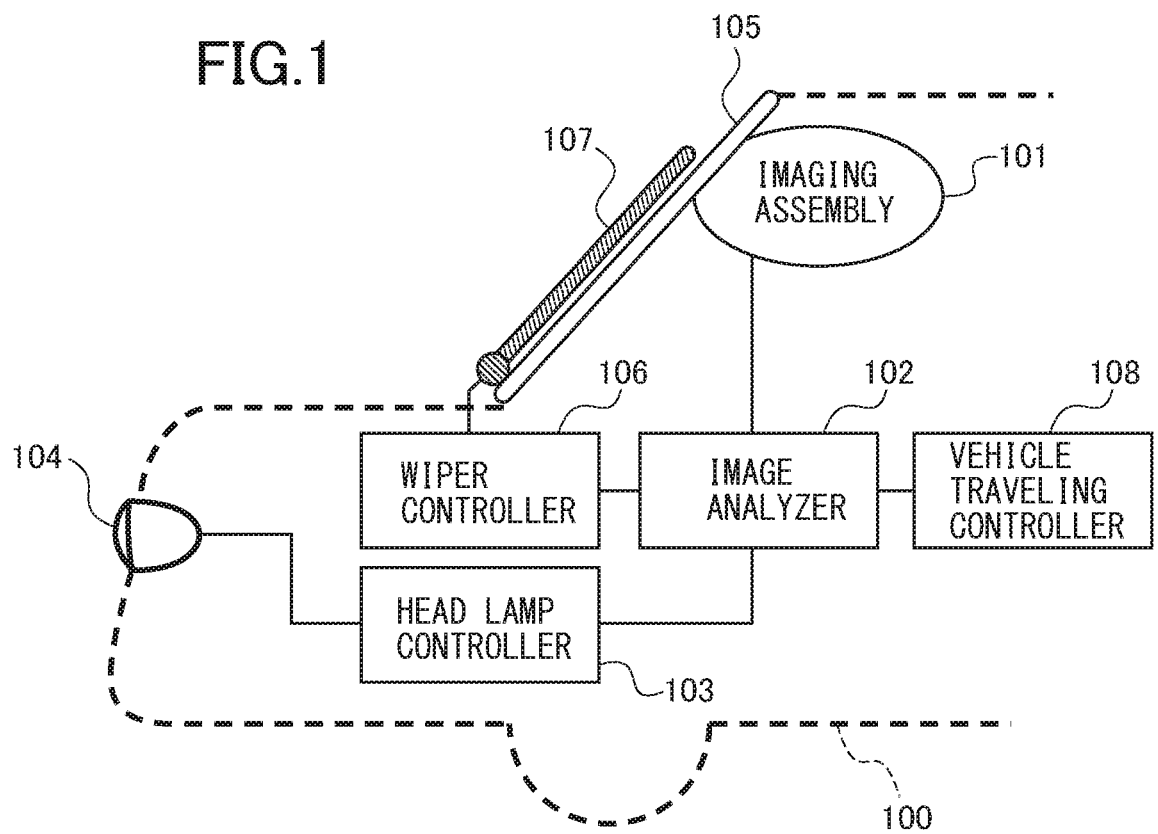
FIG. 1 is a schematic diagram showing a schematic configuration of a vehicle-mounted device control system in an embodiment.

FIG. 1 is a schematic diagram showing a schematic configuration of the vehicle-mounted device control system in the embodiment. The vehicle-mounted device control system executes light distribution control of a head lamp, drive control of a wiper, and control of other vehicle-mounted devices by using the image data imaged by an imager 200 (described hereinafter) mounted on an own vehicle 100 such as an automobile and so on which is a movable object.

The imager provided on the vehicle-mounted device control system according to the embodiment is provided in an imaging assembly 101 to image as an imaging area a front area in a travelling direction of the running own vehicle 100. The imaging assembly 101 is, for example, disposed close to a room mirror (not shown) of a windshield 105 or light-transmitting member of the own vehicle. The image data imaged by the imager of the imaging assembly 101 are input in an image analyzer 102. The image analyzer 102 is configured by a CPU or RAM and so on as a processing execution device. The image analyzer 102 analyzes the image data sent from the imager to calculate a position (direction or distance) of other vehicles existing in a front of the own vehicle 100, detect extraneous substance(s) such as rain drop(s), foreign substances adhered to the windshield 105 of the own vehicle and detect a detection object of a white line (lane division line) and so on a road surface existing in the imaging area.

A calculation result of the image analyzer 102 is sent to a head lamp controller 103. The head lamp controller 103 generates, for example, a control signal that controls a head lamp 104 which is a vehicle-mounted device of the own vehicle 100 from position data of the other vehicles calculated in the image analyzer 102. Concretely, the head lamp controller controls, for example, switching of high beam and low beam of the head lamp 104, or partial light shielding of the head lamp 104 to prevent strong light (headlight) emitted from the head lamp of the own vehicle 100 from entering eyes of a driver of the preceding vehicle or oncoming vehicle and eliminate dazzle of the driver of the other vehicle so that visibility securement of the driver of the own vehicle 100 can be realized.

The calculation result of the image analyzer 102 is also sent to a wiper controller 106. The wiper controller 106 controls the wiper to remove the extraneous substance such as rain drop or foreign substance adhered to the windshield 105 of the own vehicle 100. The wiper controller 106 receives the detected result of the extraneous substance detected by the image analyzer 102 and generates a control signal to control the wiper 107. When the control signal generated by the wiper controller 106 is sent to the wiper 107, the wiper 107 is moved to secure visibility of the driver of the own vehicle 100.

The calculated result of the image analyzer 102 is also sent to a vehicle travelling controller 108. The vehicle travelling controller 108 notices a warning to the driver of the own vehicle 100 or executes travelling support control such as controlling a steering wheel or brake of the own vehicle, when the own vehicle is out of a lane area divided by the white line based on the detected result of the white line detected by the image analyzer 102. In addition, the vehicle travelling controller 108 notices a warning to the driver of the own vehicle 100 or executes travelling support control such as controlling the steering wheel or the brake of the own vehicle, when the own vehicle is in a close distance to the preceding vehicle based on position data of the other vehicle detected by the image analyzer 102.

Figure 2:
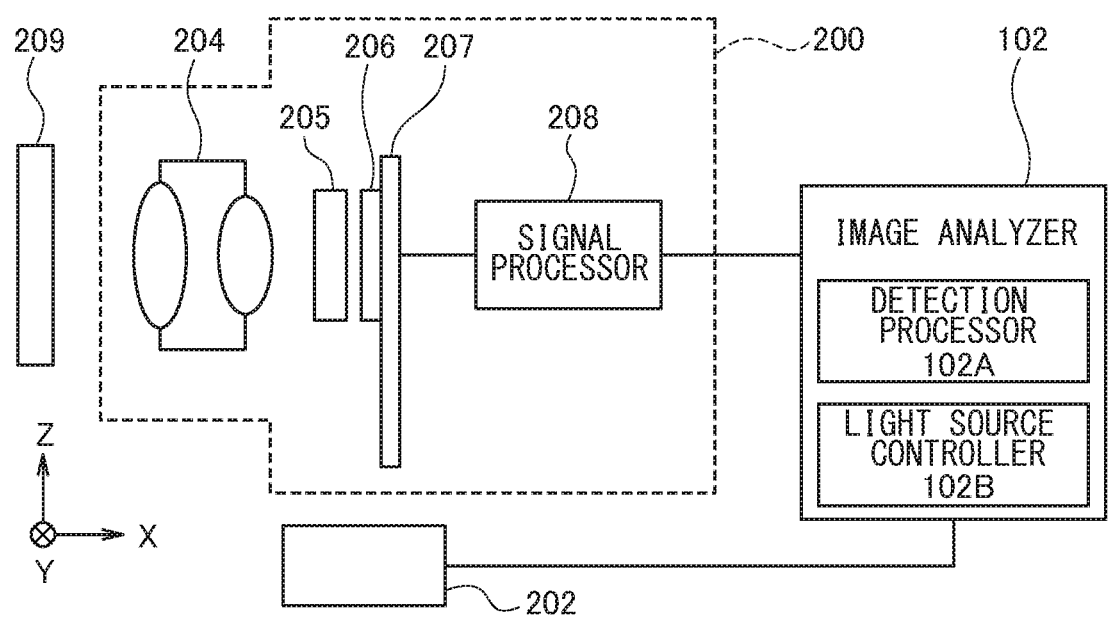
FIG. 2 is a schematic diagram of an object detector provided with an imaging assembly in the vehicle-mounted device control system.

FIG. 2 is an explanatory diagram showing a schematic configuration of an object detector including the imager 200 provided in the image assembly 101. The imager 200 is mainly composed of an imaging lens 204, an optical filter 205, a sensor substrate 207 on which an image sensor 206 in which light-receiving elements are two-dimensionally arranged is mounted, and a signal processor 208 that generates and outputs the image data in which an analogue electric signal (a quantity of light (light-receiving quantity) that each light-receiving element on the image sensor 206 receives) output from the sensor substrate 207 is converted into a digital electric signal.

A light source device 202 as a light emitter is also provided in the imaging assembly 101 in the embodiment. The light source device 202 is disposed in a side of an inner wall surface (one surface) of the windshield 105 and detects the extraneous substance (a case where the detection object is, for example, rain drop is described hereinafter as an example) adhered to an outer wall surface (opposite surface).

In the embodiment, the imaging assembly 101 is arranged such that an optical axis of the imaging lens 204 coincides in a generally horizontal direction. However, the arrangement of the imaging assembly is not limited to this and may be directed in a particular direction based on a horizontal direction (an X direction in FIG. 2), for example. The imaging lens 204 is composed of, for example, a plurality of lenses. The imaging lens is set to have a focal point which is farther than a position of the windshield 105. A focal position of the imaging lens 204 can be set to be, for example, infinity or between infinity and the windshield 105.

The image sensor 206 is composed of a plurality of light-receiving elements that are two-dimensionally arranged and receive light transmitting a cover glass that protects a surface of the sensor. The image sensor has a function that converts incident light into an electrical signal by photo-electric conversion every the light-receiving elements (imaging pixels). In drawings and so on as described below, each pixel of the image sensor 206 is simply shown. However, the image sensor 206 is actually composed of about hundreds of the thousands of pixels which are two-dimensionally arranged. The image sensor 206 is, for example, an image sensor such as a CCD (Charge Coupled Device) reading out a signal of each imaging pixel by simultaneously exposing (global shutter) all imaging pixels used as the image sensor, a CMOS (Complementary Metal Oxide Semiconductor) reading out a signal of each imaging pixel exposed by line exposure (rolling shutter) or like. Photo diodes may be used for the light-receiving elements of the imaging sensor.

The signal processor 208 has a function that generates and outputs the image data which is formed through the photo-electric conversion by the image sensor 206 and in which the analogue electric signal (light-receiving quantity at each light-receiving element of the image sensor 206) output from the sensor substrate 207 is converted into the digital electric signal. The signal processor 208 is electrically connected to the image analyzer 102. When the electric signal (analogue signal) is input from the image sensor 206 through the sensor substrate 207 in the signal processor 208, the signal processor 208 generates the digital signal (image data) showing brightness (luminance) of each imaging pixel on the image sensor 206 form the input electric signal. Then, the signal processor 208 outputs the image data to the next image analyzer 102 together with horizontal and vertical synchronous signals of the image.

In addition, the image analyzer 102 has a function that controls imaging operation of the imaging assembly 101 or analyzes the image data sent from the imaging assembly 101. The image analyzer 102 has a function that calculates an optimum exposure quantity every an imaging object (object such as the other vehicle existing in the front area of the own vehicle or rain drop adhered to the windshield 105, freezing or cloudiness of the windshield, and so on) of the image sensor 206 from the image data sent from the imaging assembly 101 and sets the optimum exposure quantity (an exposure time in the embodiment) every the imaging objects of the image sensor 206. Moreover, the image analyzer 102 has a function that adjusts a light-emitting timing of the light source device 202 by a light source controller 102B while synchronizing with an exposure adjustment quantity. In addition, the image analyzer 102 has a function that detects information regarding a road surface condition, road sign and so on from the image data sent from the imaging assembly 101. Moreover, the image analyzer 102 has a function detects a state of the windshield 105 (rain drop adhered to the windshield, freezing or cloudiness of the windshield, and so on) by a detection processor 102A. Furthermore, the image analyzer 102 has a function that calculates a position, a direction, a distance, and so on of the other vehicle existing in the front of the own vehicle from the image data sent from the imaging assembly 101.

Figure 3:
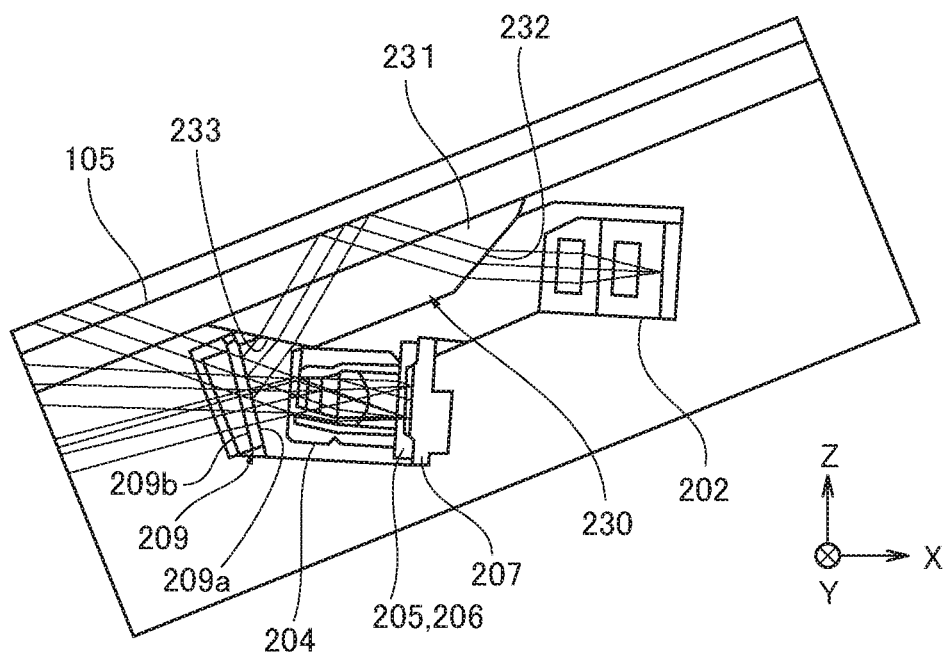
FIG. 3 is an explanatory view for explaining an optical system of the imaging assembly.
Figure 4:
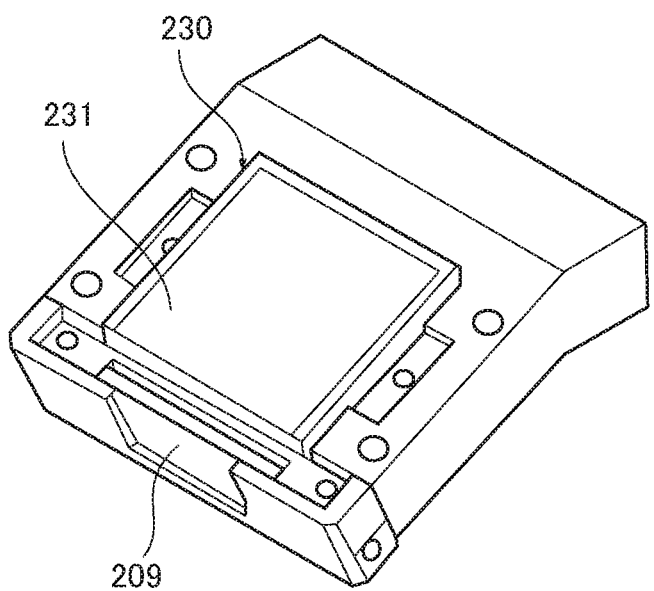
FIG. 4 is a perspective view of the imaging assembly.

FIG. 3 is an explanatory view explaining an optical system of the imaging assembly 101 in the embodiment. FIG. 4 is a perspective view of the imaging assembly 101. The light source device 202 in the embodiment emits illumination light to detect the extraneous substance (rain drop, freezing, cloudiness and so on) adhered to the windshield 105. The light source device 202 in the embodiment includes a plurality of LEDs as light sources. In this way, the plurality of light sources makes it possible to enlarge a detection area to detect the extraneous substance on the windshield 105, thereby improving detection accuracy of the extraneous substance on the windshield 105, compared with one light source. The arrangement of the LEDs in one column or a plurality columns along a Y direction in FIG. 3 makes it possible to equalize the illumination to image an image of the windshield displayed at a lower side of the image area on which an image of the front area of the vehicle or enlarge the detection area, as described hereinafter.

The light source device 202 is disposed such that a light-emitting direction of the illumination light emitted from the light source device 202 and a direction where the optical axis of the imaging lens 204 extends have a predetermined angle to each other. In addition, the light source device 202 is disposed such that an illumination range of the illumination light emitted by the light source device at the windshield 105 is within a range (within a range of field angle) of a predetermined field angle of the imaging lens 204, for example, within a range of 11 to 12 degrees.

It is preferable to avoid visible light as the light emitted from the light source device 202 so as to fail to dazzle drivers of the oncoming vehicles or walkers. The light has, for example, a wavelength longer than that of the visible light and uses a wavelength range to which light-receiving sensitivity of the image sensor 206 extends (for example, a range of wavelength of infrared light of about 800 to 1000 nm). Drive control such as an emitting timing and so on of the light source device 202 is executed through the light source controller 102B of the image analyzer 102, while synchronizing with the acquisition of an image signal from the signal processor 208.

A reflection polarization prism 230 as an illumination light guide member that guides the light emitted from the light source device 202 to the windshield 105 by incorporating the light from the light source device is provided on the imaging assembly 101 in the embodiment, as shown in FIG. 3. The reflection polarization prism 230 is disposed such that a transmission surface 231 of the reflection polarization prism 230 is closely fitted to the inner wall surface of the windshield 105 to guide adequately the illumination light from the light source device 202 to an inner portion of the windshield 105. Thereby, a most part of the illumination light emitted from the transmission surface 231 of the reflection polarization prism 203, of the illumination light entered an incident surface 232 of the reflection polarization prism 230 from the light source device 202 is entered the inner wall surface of the windshield 105.

In mounting the reflection polarization prism 230 on the inner wall surface of the windshield 105, it is preferable to insert a filling member such as gel or seal member and so on which is formed by a light-transmitting material between the reflection polarization prism 230 and the inner wall surface of the windshield 105 to improve close fitting of the reflection polarization prism 230 and the inner wall surface of the windshield 105. This is because Fresnel reflection loss between the filling member and the reflection polarization prism 230 and the filling member and the windshield 105 can be reduced. Here, the Fresnel reflection loss means reflection generating between members having different refractive indexes.

The reflection polarization prism 230 may be made of a material transmitting the illumination light emitted from the light source device 202 at least, for example, glass or plastic. Because the illumination light emitted from the light source device 202 is infrared light, it is preferable to use a material of a black color-system to absorb visible light, as a material of the reflection polarization prism 230. The use of the material that absorbs the visible light makes it possible to prevent light (visible light from exterior of vehicle and so on) other than the illumination light (infrared light) from the light source device 202 from entering the reflection polarization prism 230.

The embodiment is configured such that the illumination light entered the incident surface 232 of the reflection polarization prism 230 and entered the inner wall surface of the windshield 105 through the transmission surface 231 of the reflection polarization prism 230 is totally reflected on a non-adhesion portion of the windshield 105 at which the rain drop (detection object) is not adhered on the outer wall surface of the windshield 105, and then the reflected light is entered an inner portion of the reflection polarization prism 230 from the inner wall surface of the windshield 105 through the transmission surface 231 of the reflection polarization prism 230 again, and is emitted from the exit surface 233 of the reflection polarization prism 230. Although details are described hereinafter, generally, the illumination light emitted from the exit surface 233 of the reflection polarization prism 230 is reflected on an inner surface 209a of a wavelength filter 209 as an optical member provided on the imaging assembly 101, and thereafter is focused by the imaging lens 204 and is entered an extraneous substance detecting light-receiving area which is a second light-receiving part of the image sensor 206.

An incident angle $\theta$ of the illumination light to the outer wall surface of the windshield 105 is set to be about 50 degrees in the embodiment. An appropriate incident angle $\theta$ results in a refractive index difference between air and the outer wall surface of the windshield 105. The appropriate incident angle is between a critical angle causing the total reflection at the outer wall surface in an inner portion of the windshield 105 and a critical angle resulting in a refractive index difference in a case where extraneous substance (for example, if it is raindrop, the refractive index=about 1.33) having a refractive index different from a refractive index (=1) of air onto the outer wall surface of the windshield 105. Consequently, in the embodiment, if the extraneous substance such as raindrop and so on is not adhered onto the outer wall surface of the windshield 105, the illumination light is totally reflected on the non-adhesion portion of the windshield 105 without transmitting the illumination light at the outer wall surface of the windshield 105.

On the other hand, if extraneous substance such as rain drop (refractive index=1.33) and so on that has a refractive index different from that of air (refractive index=1) is adhered onto the outer wall surface of the windshield 105, the total reflection condition is not satisfied, and the illumination light transmits the outer wall surface of the windshield 105 at a raindrop adhesion portion where the rain drop is adhered. Therefore, in the non-adhesion portion on the outer wall surface of the windshield 105, the reflection light is received with the image sensor 206 to be an image portion of a high brightness. On the other hand, in the rain drop adhesion portion on the outer wall surface of the windshield 105, a light quantity of the reflection light is reduced, thereby resulting in the formation of an image portion of a low brightness. This is because a light quantity received with the image sensor 206 is reduced. As a result, a high contrast can be acquired between the rain drop adhesion portion and the non-adhesion portion, in the image based on the image data output from the image sensor 206.

Here, in imaging by receiving the illumination light (infrared light) emitted from the light source device 202 and reflected on the outer wall surface of the windshield 105 with the image sensor 206, for example, ambient light of a large light quantity such as sunlight and so on other than the illumination light from the light source device is entered the extraneous substance detecting light-receiving area. Accordingly, it is necessary to be sufficiently larger a light-emitting quantity of the light source device 202 than a light quantity of the ambient light to discriminate the illumination light emitted from the light source device 202 from the ambient light of the large light quantity. However, it is often difficult to use the light source device 202 emitting light of a large light quantity. Note that, in the embodiment, as described hereinafter, light of an infrared wavelength range, of the ambient light entered the extraneous substance detecting light-receiving area of the front of the vehicle is blocked by the wavelength filter 209, but light of other wavelength range (visible light wavelength range) transmits the wavelength filter 209. Accordingly, relatively much ambient light is entered the extraneous substance detecting light-receiving area of the image sensor 206.

Figure 5:
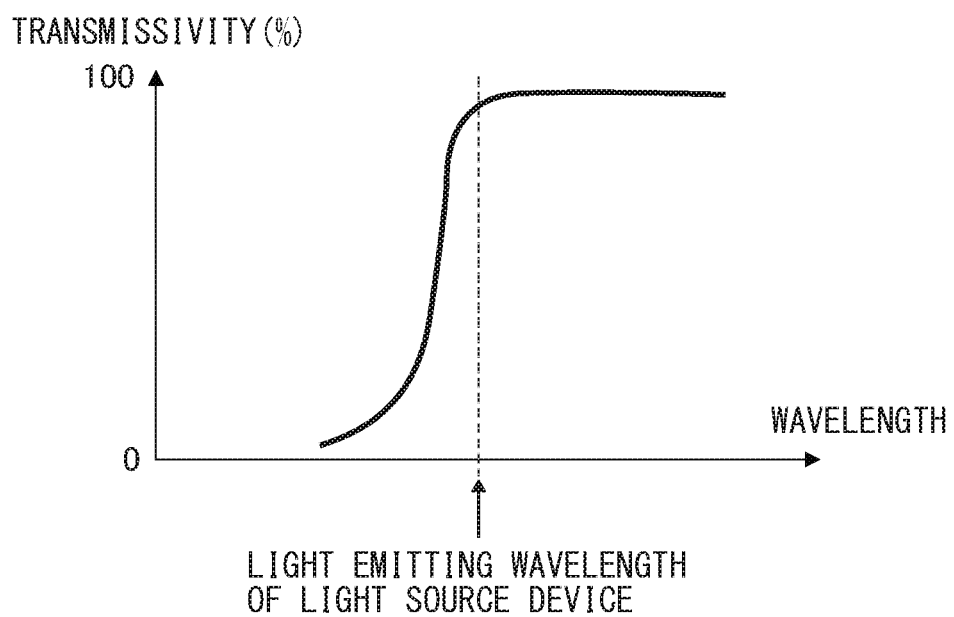
FIG. 5 is a graph showing a filter characteristic of a cut filter applicable to imaged image data to detect rain drops.
Figure 6:
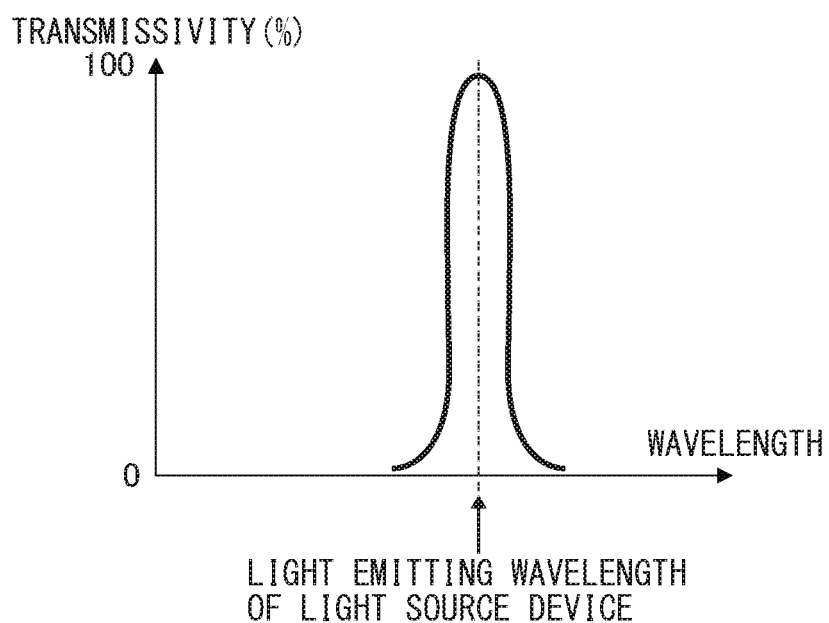
FIG. 6 is a graph showing a filter characteristic of a bandpass filter applicable to the imaged image data to detect rain drops.

Therefore, the embodiment is, for example, configured such that, the illumination light from the light source device 202 is received with the extraneous substance detecting light-receiving area of the image sensor 206 through a cut filter that blocks light of a wavelength shorter than a wavelength of light emitted from light source device 202, as shown in FIG. 5, or the optical filter 205 having a band pass filter and in which a peak of transmissivity generally coincides with the wavelength of light emitted from light source device 202, as shown in FIG. 6. Thereby, a wavelength of light other than the wavelength of the light emitted from the light source device 202 is blocked and received with the extraneous substance detecting light-receiving area of the image sensor 206. Therefore, a quantity of light emitted from the light source device 202 and received with the extraneous substance detecting light-receiving area of the image sensor 206 is relatively much to the ambient light. As a result, even if the light source device 202 does not emit much light-emitting quantity, it is possible to discriminate the illumination light from the light source device 202 from the ambient light.

However, in the embodiment, not only the rain drop onto the windshield 105 is detected from the image data by the image sensor 206, but also the preceding vehicle, the oncoming vehicle or the white line is detected. Therefore, if light in a wavelength range other than the wavelength range (infrared wavelength range) of the illumination light emitted from the light source device 202 in all areas of the image sensor 206 is blocked, light in a wavelength range necessary to detect the preceding vehicle, the oncoming vehicle, or the white line cannot be received with the image sensor 206, thereby affecting the detection.

Therefore, in the embodiment, an area of the image sensor 206 is divided in the extraneous substance detecting light-receiving area that detects the rain drop onto the windshield 105 and a front sensing light-receiving area that detects the preceding vehicle, the oncoming vehicle, or the white line. A filter that cuts a wavelength range of light other than the light in the infrared wavelength range emitted from the light source device 202 with respect to only a portion corresponding to the extraneous substance detecting light-receiving area is disposed on the optical filter 205.

Figure 7:
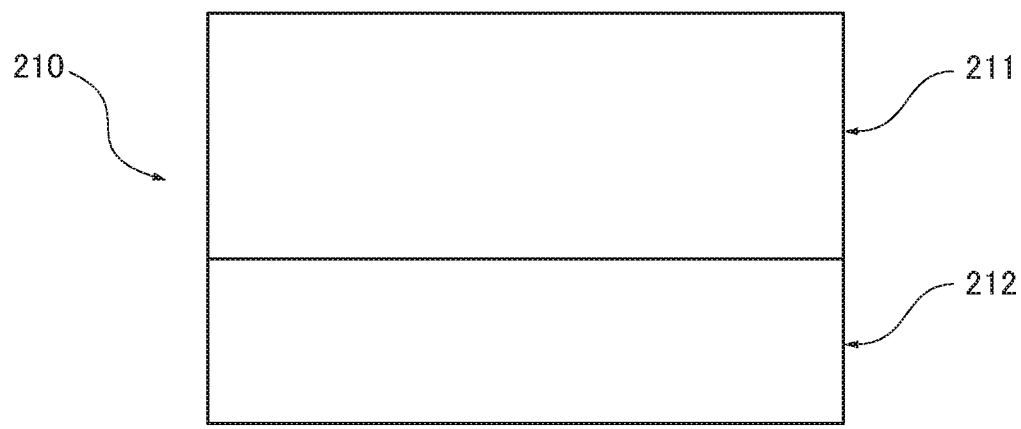
FIG. 7 is a front view of a pre-stage filter provided on an optical filter of an imager.
Figure 8:
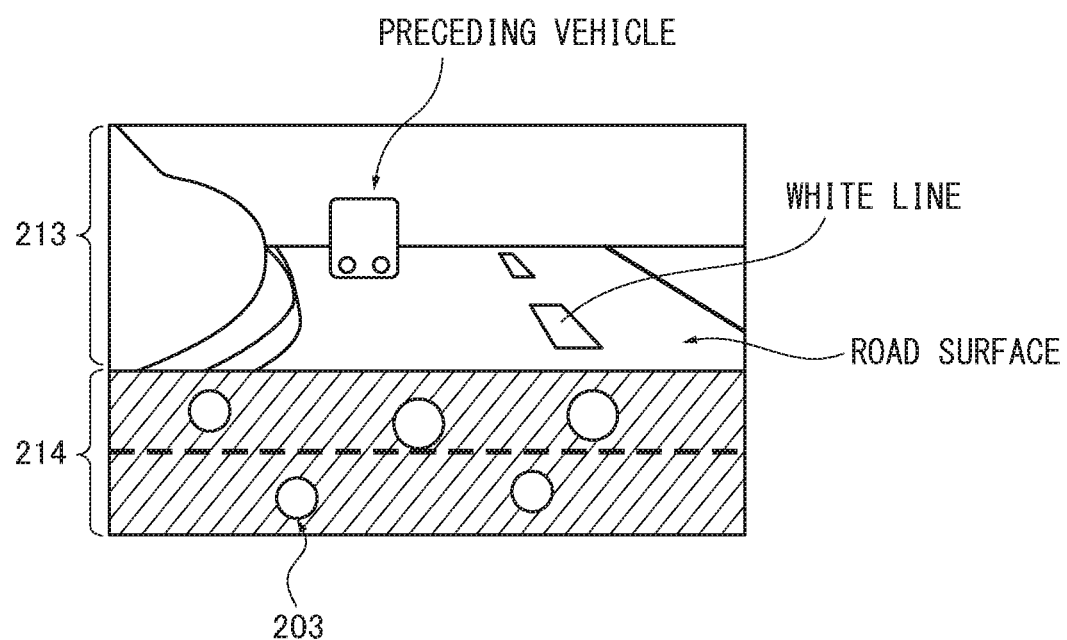
FIG. 8 is an explanatory view showing an image example of the imaged image data of the imager.

FIG. 7 is a front view of a pre-stage filter 210 provided on the optical filter 205. FIG. 8 is an explanatory diagram showing an image example of the image data. The optical filter 205 in the embodiment has a configuration in which the pre-stage filter 210 and a post-stage filter 220 are overlapped in a light-transmitting direction. The pre-stage filter 210 is divided into an infrared light cut filter area 211 disposed in the front sensing light-receiving area on the image sensor 206 corresponding to a front sensing image area 213 which is an upper portion of ⅔ of the image as imaged and an infrared light transmitting filter area 212 disposed in the extraneous substance detecting light-receiving area on the image sensor 206 corresponding to an extraneous substance detecting image area 214 which is a lower portion of ⅓ of the image as imaged, as shown in FIG. 7. The cut filter shown in FIG. 5 or the band pass filter shown in FIG. 6 is used for the infrared light transmitting filter area 212.

In the embodiment, the infrared light cut filter area 211 and the infrared light transmitting filter area 212 constituting the pre-stage filter 210 are formed by a multilayer film in which each layer has a different structure. As a method of manufacturing the pre-stage filter 210, a part of the infrared light transmitting filter area 212 is deposited through a vacuum deposition and so on, while covering a part of the infrared light cut filter area 211 with a mask, thereafter the part of the infrared light cut filter area 211 is deposited through the vacuum deposition and so on, while covering the part of the infrared light transmitting filter area 212 with a mask.

Images of a head lamp of the oncoming vehicle, a tail lamp of the preceding vehicle, and the white line often mainly exist in from a central portion to an upper portion. It is usual that an image of a direct close road surface of the front of the own vehicle exists on a lower of the image as imaged. As a result, information necessary to the discrimination of the head lamp of the oncoming vehicle, the tail lamp of the preceding vehicle, and the white line is concentrated the upper portion of the image. Information in the lower portion of the image is not important for the discrimination. In a case where the detection of the oncoming vehicle, the preceding vehicle, and the white line and the detection of the rain drop are together executed, it is suitable to set the lower portion of the image as the extraneous substance detecting image area 214 and the remaining upper portion of the image as the front sensing image area 213, as shown in FIG. 8. It is suitable to divide an area of the pre-stage filter 210 in response to this.

Note that the embodiment shows an example in which the extraneous substance detecting image area 214 is provided in a lower portion of the front sensing image area 213, in the image as imaged. However, the extraneous substance detecting image area 214 may be provided in an upper portion of the front sensing image area 213, or each of two extraneous substance detecting image areas 214 may be provided in each of the upper portion and the lower portion of the front sensing image area 213.

When inclining downward an imaging direction of the imager, there is a case where a bonnet of the own vehicle is displayed in the lower portion of the imaging area. In this case, sunlight reflected on the bonnet of the own vehicle, the tail lamp of the preceding vehicle and so on become the ambient light. If the ambient light is included in the image data, erroneous discrimination of the head lamp of the oncoming vehicle, the tail lamp, and the white line is generated. Even in this case, in the embodiment, the ambient light such as the sunlight reflected on the bonnet, or the tail lamp of the preceding vehicle and so on is cut, because the cut filter shown in FIG. 5 or the band pass filter shown in FIG. 6 is disposed at a portion corresponding to the lower portion of the imaged image. As a result, accuracy in the discrimination of the head lamp of the oncoming vehicle, the tail lamp of the preceding vehicle, and the white line can be improved.

Note that, in the embodiment, by the characteristic of the imaging lens 204, a scene in the imaging area and the image on the image sensor 206 are reversed in top and bottom. Accordingly, if the lower portion of the image is the extraneous substance detecting image area 214, an upper side of the pre-stage filter 210 of the optical filter 205 may be configured by the cut filter shown in FIG. 5 or the band pass filter shown in FIG. 6.

Here, in detecting the preceding vehicle, the detection of the preceding vehicle is executed by discriminating the tail lamp on the imaged image. However, it is difficult to detect the tail lamp in a high accuracy from only mere brightness data, because the tail lamp has a light quantity lesser than that of the head lamp of the oncoming vehicle and has much ambient light such as light from a street lamp and so on. Therefore, it is necessary to discriminate the tail lamp based on a light-receiving quantity of red color light by using spectral information for the discrimination of the tail lamp. Accordingly, in the embodiment, as described below, a red color filter or cyan filter matching with a color of the tail lamp is disposed on the post-stage filter 220 of the optical filter 205 to allow the light-receiving quantity of the red color light to detect.

However, because each light-receiving element constituting the image sensor 206 in the embodiment has sensitivity to light of an infrared wavelength range, when receiving light including the infrared wavelength range with the image sensor 206, an acquired imaged image approximately results in red color. As a result, there is a case where the discrimination of an image portion of red color corresponding to the tail lamp is difficult. Therefore, in the embodiment, a portion corresponding to the front sensing image area 213 in the pre-stage filter 210 of the optical filter 205 is formed as the infrared light cut filter area 211. Thereby, accuracy in the discrimination of the tail lamp is improved because an infrared wavelength range is excluded from the image data used for the discrimination of the tail lamp.

Figure 9:
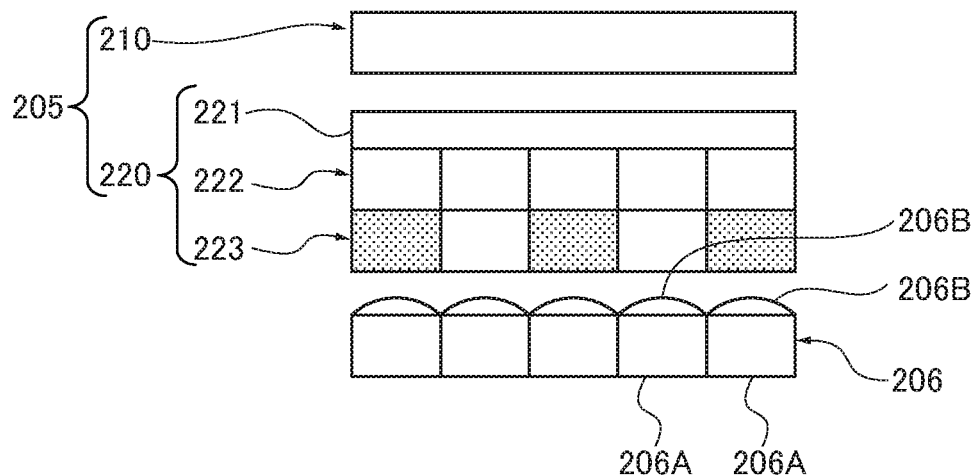
FIG. 9 is an enlarged schematic view showing the optical filter and an image sensor of the imager as viewed from a direction perpendicular to a light-transmitting direction.

FIG. 9 is an exploded schematic diagram showing the optical filter 205 and the image sensor 206 as viewed from a direction perpendicular to a light-transmitting direction. The image sensor 206 is an image sensor using the CCD or the CMOS and so on, as described above, photo diodes 206A are used for the light-receiving elements of the image sensor. The photo diodes 206A are two-dimensionally arranged in a manner of array arrangement every pixel. Each of micro lenses 206B is provided on an incident surface of each of the photo diodes 206A to increase light-collecting efficiency of each of the photo diodes 206A. The image sensor 206 is connected to a PWB (printed wiring board) through a wire bonding method and so on to form the sensor substrate 207.

The optical filter 205 is disposed to face and close to the micro lenses 206B of the of the image sensor 206. The post-stage filter 220 of the optical filter 205 has a laminating structure in which a polarizing filter layer 222 and a spectral filter layer 223 are sequentially arranged on a transparent filter substrate 221, as shown in FIG. 9. An area of each of the polarizing filter layer 222 and the spectral filter layer 223 is divided to correspond to one photo diode 206A on the image sensor 206.

A configuration in which a gap is provided between the optical filter 205 and the image sensor 206 may be taken. However, it is suitable to take a configuration closely fitting the optical filter 205 to the image sensor 206, because the configuration makes it possible to easily accomplish the coincidence of a boundary of each area of the polarizing filter layer 222 and the spectral filter layer 223 of the optical filter 205 and a boundary between the photo diodes 206A on the image sensor 206. The optical filter 205 and the image sensor 206 may be adhered by, for example, a UV adhesive, or four side areas out of an effective pixel range using in imaging may be adhered by UV adhesion or heat compression bonding in a state where portions out of the effective pixel range using in imaging are supported by a spacer.

Figure 10:
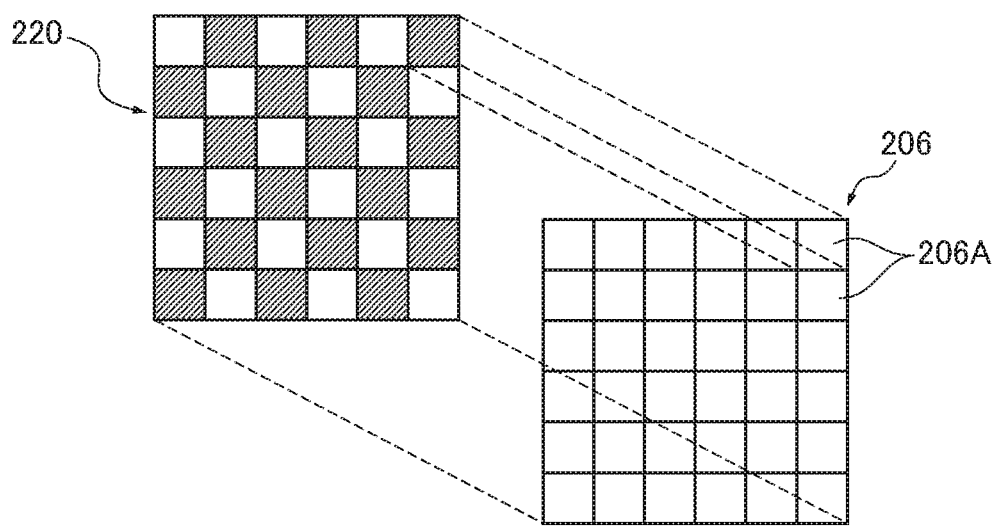
FIG. 10 is an explanatory view showing an area division pattern of a polarizing filter layer and a spectral filter layer of the optical filter.

FIG. 10 is an explanatory view showing an area division pattern of the polarizing filter layer 222 and the spectral filter layer 223 of the optical filter 205 according to the embodiment. The polarizing filter layer 222 and the spectral filter layer 223 are provided on the portions corresponding to the front sensing image area 213. Each of two types of areas of a first area and a second area in each of the polarizing filter layer 222 and the spectral filter layer 223 is disposed to correspond to one photo diode 206A on the image sensor 206. Thereby, a light-receiving quantity received by each photo diode 206A on the image sensor 206 can be acquired as polarizing information or spectral information in accordance with the types of areas of the polarizing filter layer 222 and the spectral filter layer 223 through which the received light passes.

The area division pattern of the spectral filter layer 223 is not limited to a pattern in which the two types of areas are arranged in a checkered pattern. For example, as an example shown in FIG. 11, the area division pattern may be formed in a pattern in which spectral filters of R, G, and B primary colors are arranged in a bayer arrangement. In the example shown in FIG. 11, a spectral filter area for R color and a spectral filter area for B color are arranged in two filter areas positioned at an opposite angle of four filter areas in light-receiving elements of 2×2, and spectral filter areas for G color are arranged in two filter areas positioned at another opposite angle. Here, each of the spectral filter areas for R, G, and B colors has a transmissivity characteristic as shown in FIG. 12, and transmits light of in wavelength ranges of Red color, Green color, and Blue color. Thereby, it is possible to acquire in detail information based on spectral information such as the detection of the tail lamp of preceding vehicle, the detection of traffic signs and so on.

Figure 11:
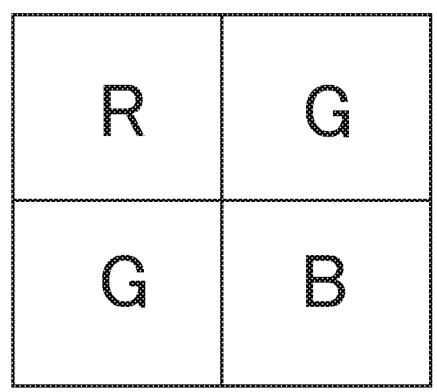
FIG. 11 is an explanatory view showing only a portion corresponding to a light-receiving element of 2×2 as one example of the area division pattern of the spectral filter layer provided on a portion corresponding to a front sensing light receiving area.
Figure 12:
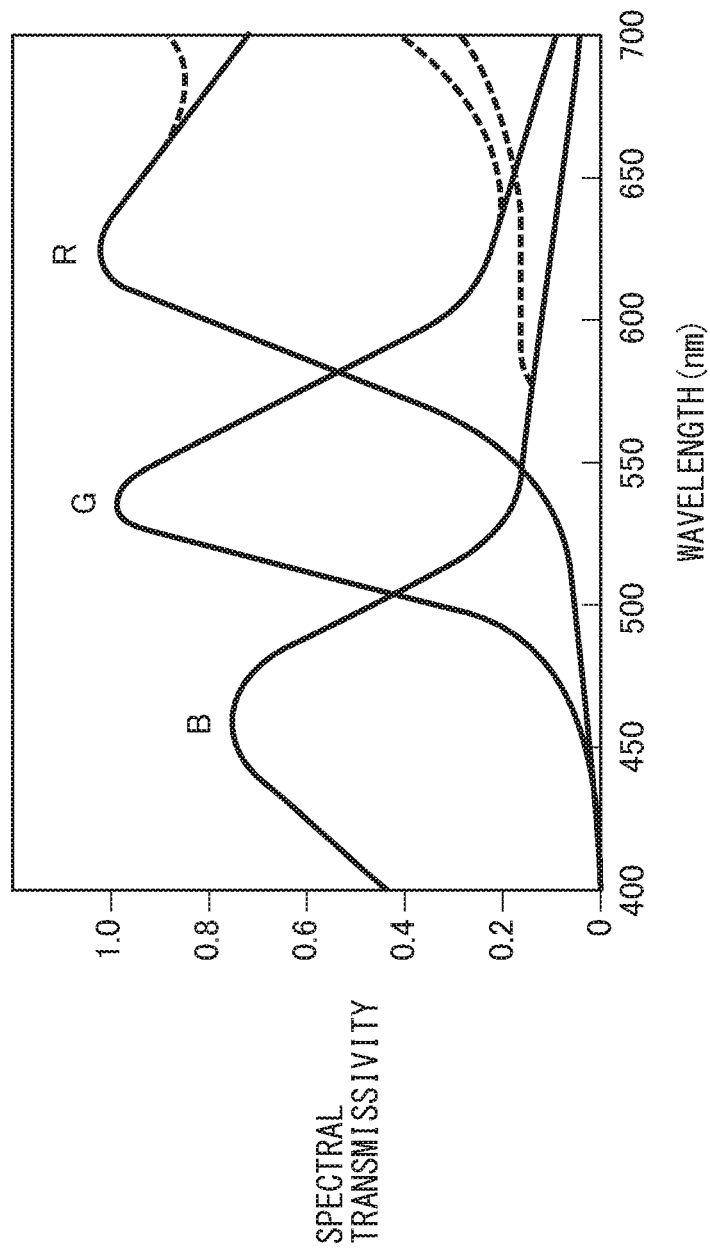
FIG. 12 is a graph showing a transmissivity characteristic of each spectral filter area for R, G, and B of the spectral filter layer.
Figure 13:
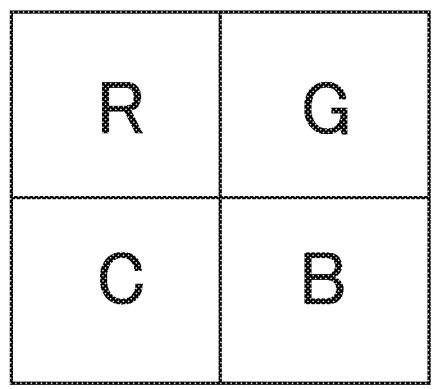
FIG. 13 is an explanatory view showing only the portion corresponding to the light-receiving element of 2×2 as other example of the area division pattern of the spectral filter layer provided on the portion corresponding to the front sensing light receiving area.

In addition, for example, as shown in FIG. 13, one of the spectral filter areas for G color shown in FIG. 11 may be formed in a non-filter area (filter area transmitting light in all wavelength ranges). The provision of the non-filter area (area shown at sign C in FIG. 13) causes an image in a front of the vehicle in the night of an insufficient light quantity, for example, to acquire easily, because light transmissivity increases further than that of the spectral filter area.

Figure 14:
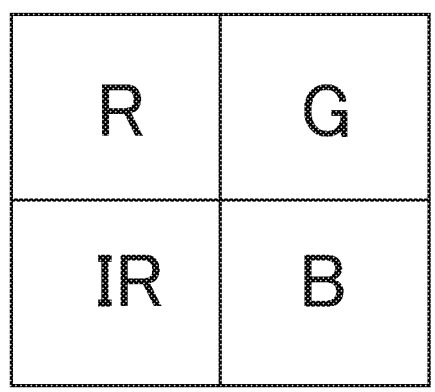
FIG. 14 is an explanatory view showing only the portion corresponding to the light-receiving element of 2×2 as further other example of the area division pattern of the spectral filter layer provided on the portion corresponding to the front sensing light receiving area.

In addition, for example, as shown in FIG. 14, one of the spectral filter areas for G color shown in FIG. 11 may be formed in a filter area for infrared light that transmits selectively infrared light. The provision of the filter area for infrared light (area shown at sign IR in FIG. 14) makes it possible to add the infrared light to light projected from the head lamp of the vehicle, thereby detecting an obstacle in the night easily.

However, in the embodiment, the infrared light cut filter area 211 is provided on the portion of the pre-stage filter of the optical filter 205, corresponding to the front sensing image area 213. Therefore, it is required that infrared light in the light (headlight) from the head lamp is not cut by the infrared light cut filter area 211. On the other hand, the infrared light cut filter area 211 functions to prevent a state where ambient light occurs by receiving the illumination light emitted from the light source device 202 with the front sensing image area 213. Consequently, it is requested that the infrared light cut filter area 211 has a configuration in which the illumination light emitted from the light source device 202 is prevented from being received with the front sensing image area 213 and the infrared light of the head lamp of the own vehicle is received with the front sensing image area 213 to detect easily an obstacle in the night.

As such a configuration, for example, the following configuration is exemplified. A wavelength range (first infrared range) of the infrared light of the head lamp of the own vehicle and a wavelength range (second infrared range) of infrared light in the illumination light emitted from the light source device 202 are set to have a wavelength range that does not overlap to each other. As a concrete example, the first infrared range is a range of 750 nm to 900 nm, and the second infrared range is a range of 900 nm to 1,000 nm. Note that a visible light range is a range of about 400 nm to 750 nm. Although it is preferable not to overlap completely the first infrared range and the second infrared range, even if the first infrared range and the second infrared range are slightly overlapped each other in the foregoing ranges, there is no problem in a property of the filter as described below, because it is hard to set transmission and non-transmission (cut) by strictly selecting the ranges as described.

The wavelength filter 209 is configured to have a filter characteristic transmitting light in the visible light range and the first infrared range and shutting and reflecting light in the second infrared range. By taking such a configuration, light in the visible light area of light incorporated from the imaging area of the front of the vehicle and light reflected on an obstacle illuminated by infrared light (first infrared range) of the head lamp transmit the wavelength filter 209 and are focused on the front sensing light-receiving area of the image sensor 206. On the other hand, light of the illumination light (second infrared range) from the light source device 202, reflected on the windshield 105 is reflected on a surface emitted from the wavelength filter 209 and can be entered the extraneous substance detecting light-receiving area of the image sensor 206

At this time, there is a possibility that the infrared light (first infrared range) of the head lamp incoming from the imaging area of the front of the vehicle is entered the extraneous substance detecting light-receiving area and hence ambient light occurs. Therefore, it is preferable to provide the portion of the optical filter 205 corresponding to the extraneous substance detecting light-receiving area with a filter function that cuts the visible light range and the first infrared range and transmits the second infrared range. However, as shown in FIG. 15 described below, a case of providing each of filter members 206D provided to correspond to all the photo diodes 206A in the image sensor 206 also with an infrared light transmitting filter function (filter function that cuts the visible light range) in the optical filter 205, the filter members 206D are configured to transmit both the first infrared range and the second infrared range.

Note that the image sensor 206 may be configured as an imaging element for color, although the image sensor is considered to configure an imaging element for a monochromatic image. If the image sensor 206 is configured by the imaging element for color, a light transmitting characteristic of each of the polarizing filter layer 222 and the spectral filter layer 223 in accordance with a characteristic of a color filter belong to each imaging pixel of the imaging element for color may be adjusted. In other words, it is possible to use the image sensor 206 having one or all filter functions that the pre-stage filter 210 (the infrared light cut filter area 211 or the infrared light-transmitting filter area 212) or the post-stage filter 220 (the polarizing filter layer 222 or the spectral filter layer 223) constituting optical filter 205 takes. By using such an image sensor 206, the optical filter 205 is simplified, the optical filter itself is not required, and as a whole, cost reduction can be accomplished.

Figure 15:
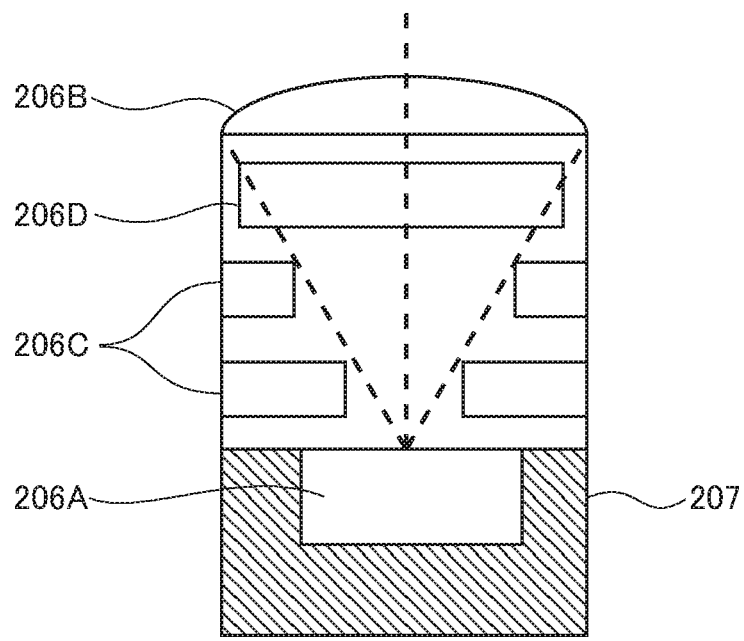
FIG. 15 is an enlarged sectional schematic view showing one light-receiving element portion in other image sensor capable of using in the embodiment.

As such an image sensor, for example, an image sensor in which light-receiving elements are two-dimensionally arranged, as shown in FIG. 15 is used. In a section taken on a portion of the light-receiving element of the image sensor, the micro lens 206B, the filter member, wirings 206C, and the photo diode 206A are arranged in a layer in order from an incident side of light (upper side in FIG. 15). The filter member 206D is configured to have a filter function similar to that of the pre-stage filter 210 or the post-stage filter 220 constituting the optical filter 205, similarly to the above. Such a filter member 206D can be prepared by using an existing method of manufacturing, for example, to adhere a filter material having a predetermined filter function on a transparent basic layer of a lower side of the micro lens 206B in a form of multilayer film, by deposition and so on, as shown in FIG. 15.

Figure 16:
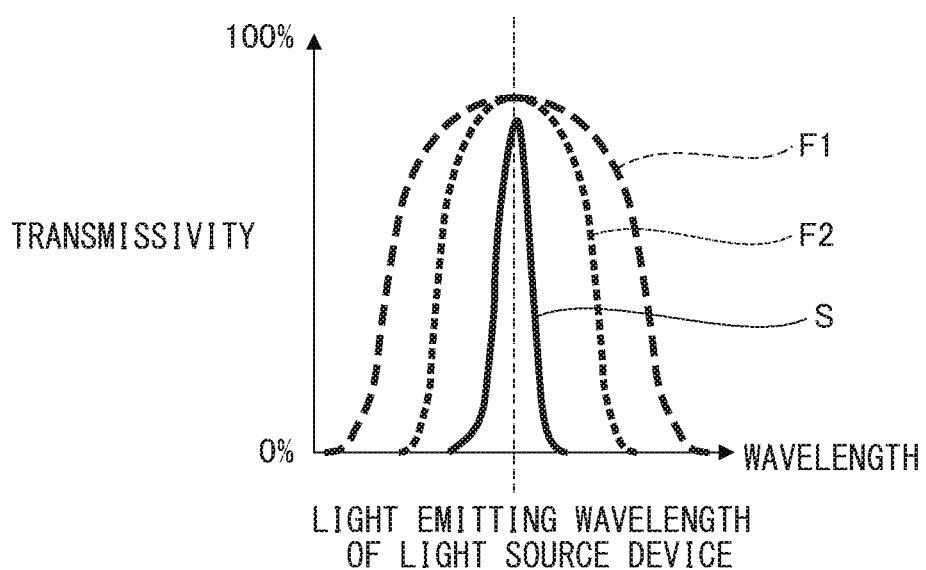
FIG. 16 is a graph showing one example of a suitable filter characteristic in a case of providing a filter member of the image sensor with an infrared light-transmitting filter function.

A case of providing the filter members 206D with the infrared light-transmitting filter function, it is possible to suitably apply a band pass filter that selectively transmits an infrared light range of a relatively wide range to the portion corresponding to the front sensing image area 213, as shown by sign F1 in FIG. 16. On the other hand, it is possible to suitably apply a band pass filter that selectively transmits an infrared light range of a relatively narrow range to the portion corresponding to the extraneous substance detecting image area 214, as shown by sign F2 in FIG. 16. However, it is desired that a band pass filter is configured to include a distribution range of a wavelength of light emitted from the light source device 202.

Note that polarizing information or spectral information with respect to one pixel may acquire by using light quantities of other pixels positioned on a circumference of the one pixel without acquiring from only the light quantity of the one pixel.

In the embodiment, the first area of the polarizing filter layer 222 is a vertical polarizing area that transmits selectively only a vertical polarization component that vibrates parallel with a column (a vertical direction) of the imaging pixels of the image sensor 206 and the second area of the polarizing filter layer 222 is a horizontal polarizing area that transmits selectively only a horizontal polarization component S that vibrates parallel with a row (a horizontal direction) of the imaging pixels of the image sensor 206. The first area of the spectral filter layer 223 is a red color spectral area that transmits selectively only light of a red color wavelength range (particulate wavelength range) included in a using wavelength range capable of transmitting the polarizing filter layer 222 and the second area of the spectral filter layer 223 is a non-spectral area that transmits light without selecting a wavelength. In the embodiment, one image pixel for the image data is composed of the total four imaging pixels a to d of two pixels in two columns and two pixels in two rows which are arranged adjacent to each other.

Concretely, light that transmits the vertical polarizing area (first area) of the polarizing filter layer 222 and the red color spectral area (first area) of the spectral filter layer 223 in the optical filter 205 is received with the imaging pixel a. Accordingly, the imaging pixel a receives light P/R of the red color wavelength range R in the vertical polarization component P. The imaging pixel b receives light that transmits the vertical polarizing area (first area) of the polarizing filter layer 222 and the non-spectral area (second area) of the spectral filter layer in the optical filter 205. Accordingly, the imaging pixel b receives light P/C of non-spectrum C in the vertical polarization component P. Light that transmits the horizontal polarizing area (second area) of the polarizing filter layer 222 and the non-spectral area (second area) of the spectral filter layer 223 in the optical filter 205 is received with the imaging pixel c. Accordingly, the imaging pixel c receives light S/C of non-spectrum C in the horizontal polarization component S. The imaging pixel c receives light that transmits the vertical polarizing area (first area) of the polarizing filter layer 222 and the red color spectral area (first area) of the spectral filter layer 223 in the optical filter 205. Accordingly, the imaging pixel d receives the light P/R of the red color wavelength range R in the vertical polarization component P as similarly to the imaging pixel a.

With the structure as described above, according to the embodiment, one image pixel with respect to a vertical polarization component image of red color light is acquired from output signals of the imaging pixels a and d. One image pixel with respect to a vertical polarization component image of non-spectrum is acquired from an output signal of the imaging pixel b. One image pixel with respect to a horizontal polarization component image of non-spectrum is acquired from an output signal of the imaging pixel c. As a result, according to the embodiment, it is possible to acquire three types of image data of the vertical polarization component image of red color, the vertical polarization component image of non-spectrum, and the horizontal polarization component image of non-spectrum by one-time imaging operation.

The vertical polarization component image of red color light thus acquired can be used, for example, to discriminate the tail lamp. It is possible to acquire a red color image in which disturbance factors are restrained by strong red color light of the horizontal polarization component S as red color light reflected on the road surface, red color light from a dashboard in a vehicle room of the own vehicle 100 and so on, because the horizontal polarization component S in the vertical polarization component image of red color light is cut. Therefore, a discrimination ratio of the tail lamp is improved by using the vertical polarization component image of red color for the discrimination of the tail lamp.

In addition, the vertical polarization component image of non-spectrum can be used, for example, for the discrimination of the white line, or the head lamp of the oncoming vehicle. It is possible to acquire a non-spectrum image in which disturbance factors are restrained by strong white color light of the horizontal polarization component S such as white color light of the head lamp or street lamp and so on reflected on the road surface, white color light (projected light) and so on from the dashboard and so on in the vehicle room of the own vehicle 100 and so on, because the horizontal polarization component S in the horizontal polarization component image of non-spectrum is cut. Accordingly, by using the vertical polarization component image of non-spectrum for the discrimination of the white line or the head lamp of the oncoming vehicle a discrimination ratio of the white line or the head lamp is improved. In particular, in a rain road, it is usually known that reflection light on the water surface covering the road surface includes many horizontal polarization components S. Therefore, it is possible to suitably discriminate the white line under the water surface in the rain road by using the horizontal polarization component image of non-spectrum for the discrimination of the white line, thereby improving a discrimination ratio.

If a comparison image formed as a pixel value an index value that compares pixels between the vertical polarization component image of non-spectrum and the horizontal polarization component image of non-spectrum is used, it is possible to accomplish a highly accurate discrimination of metal objects in the imaging area, a drying state of the road surface, three-dimensional objects in the imaging area, and the white line on the rain road. It is possible to use, as the comparison image used here, for example, a difference image in which a difference value of pixel values between the vertical polarization component image of non-spectrum and the horizontal polarization component image of non-spectrum is formed as a pixel value, a ratio image in which a ratio of the pixel values between these images is formed as the pixel value, or difference polarization image in which a ratio of the difference values of the pixel values between the images relative to the total of pixel values between the images is formed as the pixel value, and so on.

Note that, in the embodiment, for example, the infrared light cut filter area 211 may be provided on the imaging lens 204, without providing the infrared light cut filter area 211 on the optical filter 205. In this case, the optical filter 205 can be easily manufactured. On the other hand, it is not necessary to provide the polarizing filter layer.

Light Distribution Control of Head Lamp

Light distribution control of the head lamp in the embodiment is described hereinafter. The light distribution control of the head lamp in the embodiment is to analyze the image data as imaged in the imager 200 to discriminate the tail lamp and the head lamp of the vehicle, and detect the preceding vehicle from the discriminated tail lamp and detect the oncoming vehicle from the discriminated head lamp. Then, the switch between the high beam and the low beam of the head lamp 104 is controlled or partial light-shielding control of the head lamp 104 is executed so as to be capable of realizing the visibility securement of the driver of the own vehicle 100, while preventing the dazzle of a driver of other vehicle by preventing strong light of the head lamp of the own vehicle 100 from being incorporated in the eyes of the driver of the preceding vehicle or the oncoming vehicle.

In the light distribution control in the embodiment, of information which can be acquired from the imaging assembly 101, intensity (brightness information) of light emitted from each position (light source body) in the imaging area, a distance (distance information) between a light source body (other vehicle) of the head lamp, the tail lamp or the like and the own vehicle, spectral information by the comparison of a red color component and a white color component of light emitted from each light source body, polarization information by the comparison of a horizontal polarization component and a vertical polarization component of the white color component, vertical polarization component information of the white color component, in which the horizontal polarization component is cut, and vertical polarization component information of the red color component, in which a horizontal polarization component is cut, of information which can be acquired from imaging assembly 101.

The brightness information is described below. If the preceding vehicle or the oncoming vehicle exists in the same distance as the own vehicle in the night, when the preceding vehicle or the oncoming vehicle is imaged by the imager 200, on the image data, the head lamp of the oncoming vehicle which is one of the detection objects is projected most brightly, the tail lamp of the preceding vehicle which is one of the detection objects is projected to be darker than that of the head lamp. If a reflector is projected on the image data, the reflector is not a light source emitting from itself, and is merely projected brightly by reflecting the head lamp of the own vehicle. Therefore, in the case of the reflector, the brightness becomes darker than that of the tail lamp of the preceding vehicle. On the other hand, the light from the head lamp of the oncoming vehicle, the tail lamp of the preceding vehicle, and the reflector is observed to be gradually dark on the image sensor 206 receiving the light as a distance becomes longer. Accordingly, it is possible to execute primary discrimination of the two types of detection objects (head lamp and the tail lamp) and the reflector by using the brightness (brightness information) acquired from the image data as imaged.

Next, the distance information is described. Because the head lamp or the tail lamp has often a configuration of a pair of right and left lamps, it is possible to obtain a distance between the head lamp or the tail lamp, in other words, the other vehicle and the own vehicle by use of the configuration. The pair of right and left lamps are displayed on the image data imaged by the imager 200 to be close to each other and direct and positioned in the same height direction. Extents of lamp image areas projecting the lamps are approximately the same and shapes of the lamp image areas are also approximately the same. If the characteristics are conditions, it can be discriminated that lamp image areas that satisfy the conditions are the pair of lamps. In case of a long distance, the right and left lamps cannot be discriminated to be the right lamp or the left lamp, and can be recognized as a single lamp.

If the pair of lamps can be discriminated by the method as described, it is possible to calculate a distance to the light source of the head lamp or the tail lamp of the pair-lamp configuration. That is to say, a distance between the right and left head lamps and a distance between the right and left tail lamps of the vehicle can approximate a fixed value wo (for example, a degree of 1.5 m). On the other hand, since a focal distance f of the imaging lens 204 in the imager 200 is known, by calculating from the image data a distance w1 between two lamp image areas corresponding respectively to the right and left lamps on the image sensor 206 of the imager 200, it is possible to obtain a distance x between the light source of the head lamp or the tail lamp of the pair lamp configuration and the own vehicle by a simple proportion calculation (x=f×w0/w1). In this way, if the calculated distance x is in an appropriate range, the two lamp image areas used for the calculation can discriminate as the head lamp and the tail lamp of the other vehicle. As a result, by using the distance information, the accuracy in the discrimination of the head lamp and the tail lamp which are the detection objects is enhanced.

Next, the spectral information is described. In the embodiment, as described above, by extracting only pixel data corresponding to the imaging pixels a, b, c, d, etc. on the image sensor 206 receiving the red color light (vertical polarization component) P/R from the image data imaged by the imager 200, it is possible to generate a red color image in which only the red color component in the imaging area is projected. Therefore, if an image area having a brightness exceeding a predetermined brightness exists in the red color image, the image area can be discriminated as a tail lamp image area in which the tail lamp is projected.

In addition, by extracting only pixel data corresponding to the imaging pixel b, etc. on the image sensor 206 receiving the vertical polarization component P/C of the white color light (non-spectrum) from the image data imaged by the imager 200, it is possible to generate a monochromatic brightness image (vertical polarization component) in the imaging area. Therefore, it is, also, possible to calculate a brightness ratio (red color brightness ratio) between the image area on the red color image and the image area on the monochromatic brightness image corresponding to the image area on the red color. If the red color brightness ratio is used, it is possible to grasp a ratio of a relative red color component included in the light from the object (light source body) existing in the imaging area. It is possible to improve the accuracy in the discrimination of the tail lamp if the red color brightness ratio is used, since the red color brightness ratio of the tail lamp has a value sufficiently higher than that of the head lamp or other many light sources.

Next, the polarization information is described. In the embodiment, as described above, by extracting pixel data corresponding to the imaging pixel b, etc. on the image sensor 206 receiving the vertical polarization component P/C of the white color light (non-spectrum) and pixel data corresponding to the imaging pixel c, etc. on the image sensor 206 receiving the horizontal polarization component S/C of the white color light (non-spectrum) from the image data imaged by the imager 200, it is possible to obtain the comparison image that compares the pixel value (brightness) between the image data for each pixel of the image. Concretely, for example, it is possible to obtain as the comparison image the difference image in which the difference value (S−P) of the vertical polarization component P of the white color light (non-spectrum) and the horizontal polarization component S of the white color light (non-spectrum) is the pixel value. According to the comparison image, it is possible to significantly take contrast between the image area (head lamp image area) of direct light directly incorporated from the head lamp in the imager 200 and the image area of indirect light which is emitted from the head lamp, reflected on the water surface in the rain road, and incorporated in the imager 200, thereby improving the discrimination accuracy in the head lamp.

In particular, it is possible to suitably use as the comparison image, a comparison image in which a ratio (S/P) of the vertical polarization component P of the white color light (non-spectrum) and the horizontal polarization component S of the white color light (non-spectrum) is the pixel value, a difference polarization degree image in which a difference polarization degree ((S−P)/(S+P)) is the pixel value and so on. Generally, it is known that light reflected on a horizontal mirror surface such as water surface has always a strong horizontal polarization component. In particular, in case of taking the ratio (S/P) of the horizontal polarization component S and the vertical polarization component P, or the difference polarization degree ((S−P)/(S+P)), it is known that the ration or the difference polarization degree is the maximum at a particulate angle (Brewster angle). Since the rain road is in a state which is substantially a mirror surface where water extends on an asphalt surface which is a scattering surface, light of the head lamp reflected on the road surface has a horizontal polarization component S stronger than that of a vertical polarization component P. Consequently, the image area of the reflection light of the head lamp on the road surface has a large pixel value (brightness) in the comparison image or the difference polarization degree image. On the other hand, the direct light from the head lamp has a small pixel value (brightness) in the comparison image or the difference polarization degree image, because of non-polarization light basically. With the difference, the reflection light of the head lamp on the rain road surface, having the same degree of light quantity as that of the direct light from the head lamp can be suitably removed, and the direct light from the head lamp can be discriminated separately from the reflection light of the head lamp.

In addition, according to the embodiment, it is possible to discriminate the direct light and the reflected light of the tail lamp or the head lamp in a high accuracy by using the foregoing polarization information with respect to the image area of each lamp discriminated by the spectral information. Concretely, for example, in regard to the tail lamp, it is possible to discriminate the direct light from the tail lamp of the preceding vehicle and the reflection light of the tail lamp on the rain road surface by using a difference in frequency or intensity of the horizontal polarization component based on the pixel value (brightness value) of the red color image of the foregoing horizontal polarization component S or the difference polarization degree and so on. On the other hand, for example, in regard to the head lamp, it is possible to discriminate the direct light from the head lamp of the preceding vehicle and the reflection light of the head lamp on the rain road surface by using a difference in frequency or intensity of the horizontal polarization component based on the pixel value (brightness value) of the white color image of the foregoing horizontal polarization component S or the difference polarization degree and so on.

Figure 17:
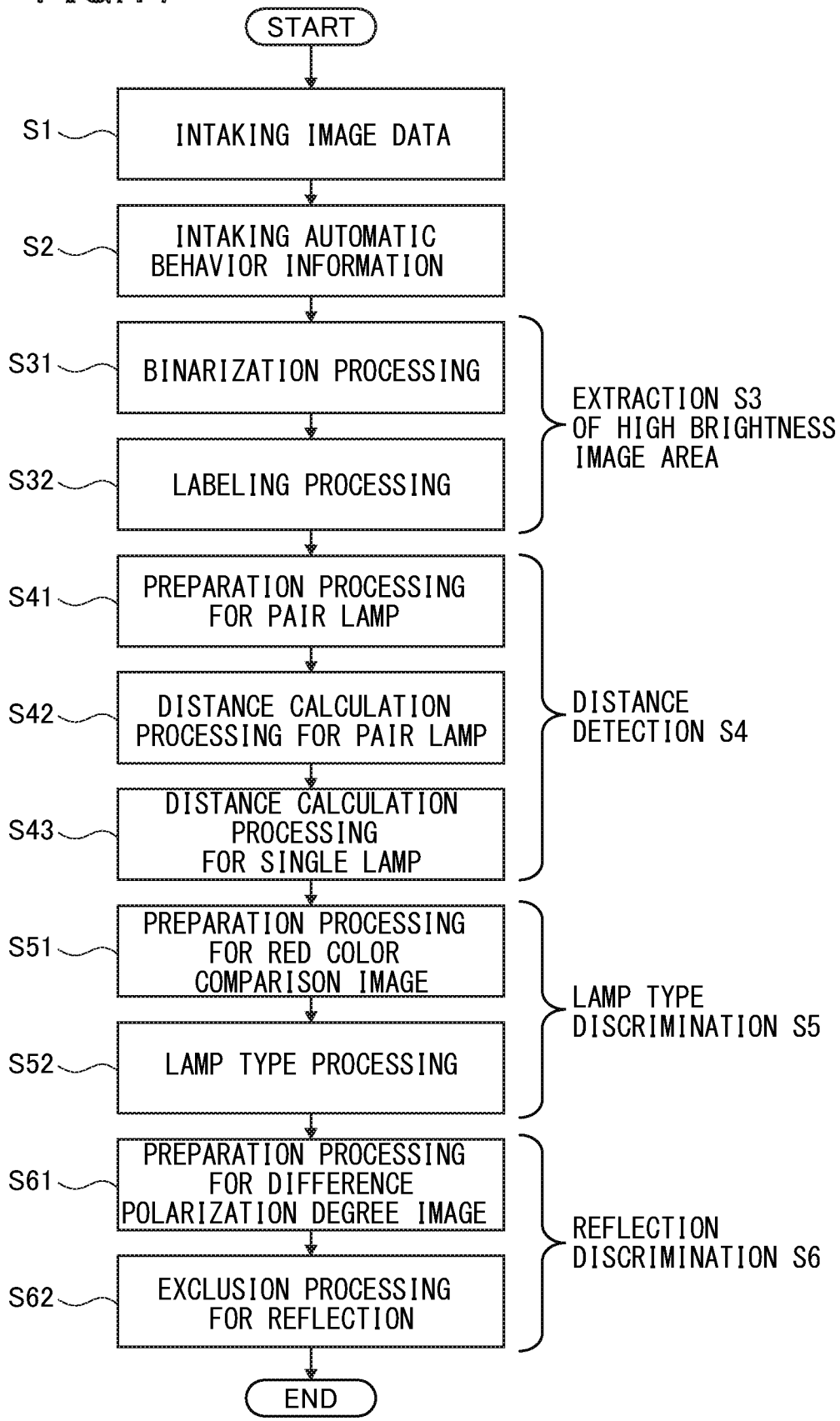
FIG. 17 is a flowchart showing a flow of vehicle detection processing in the embodiment.

Next, a flow of detection processing of the preceding vehicle and the oncoming vehicle in the embodiment is described. FIG. 17 is a flow chart showing a flow of vehicle detection processing in the embodiment. In the vehicle detection processing in the embodiment, image processing is executed to an image data imaged by the imager 200 and an image area which is appeared to be a detection object is extracted. Then, the preceding vehicle and the oncoming vehicle are detected by discriminating whether a type of a light source body projected on the image area is either one of two types of detection objects.

First, in step S1, image data of a front of the own vehicle imaged by the front sensing image area of the image sensor 206 of the imager 200 are taken in a memory. The image data includes a signal showing brightness in each imaging pixel of the image sensor 206, as mentioned above. Next, in step S2, information regarding a behavior of the own vehicle is taken from a vehicle behavior sensor (not shown).

In step S3, an image area (high brightness image area) of a high brightness considered to be the detection object (the tail lamp of the preceding vehicle and the head lamp of the oncoming vehicle) from the image data taken in the memory is extracted. The high brightness image area is a bright area having brightness higher than brightness of a predetermined threshold in the image data and has often a plurality of areas, but all of these are extracted. Therefore, in this step, the image area projecting the reflection light from the rain road surface is also extracted as the high brightness image area.

In extracting processing of the high brightness image area, first, in step S31, binarization processing is executed by comparing the brightness value of each imaging pixel on the image sensor 206 with the predetermined threshold brightness. Concretely, a binarization image is prepared by allocating [1] to a pixel having a brightness more than the predetermined threshold brightness and [0] to a pixel having no a brightness more than the predetermined threshold brightness. Next, in step S32, if the pixel to which [1] is allocated is close in the binarization image, labeling processing recognizing them as one high brightness image area is executed. Thereby, an assembly of a plurality of pixels which are close to each other of high brightness values is extracted as one high brightness image area.

In step S4 executed after the high brightness image area extracting processing as mentioned above, a distance between the object and the own vehicle in the imaging area corresponding to each high brightness image area as extracted is calculated. In the distance calculation processing, pair lamp distance calculation processing that detects a distance by using that lamps of the vehicle are a pair of right and left lamps and single lamp distance calculation processing of a case where the pair lamps are recognized as a single lamp without recognizing separately right and left lamps constituting the pair lamps if a distance becomes longer are executed.

First, for the pair lamp distance calculation processing, in step S41, pair lamp preparation processing that is also processing preparing a pair of lamps is executed. The pair of right and left lamps which correspond to the pair lamp are close to each other and positioned at approximately the same height in the image data imaged by the imager 200 and satisfy conditions in that an area of the high brightness image area is approximately the same and a shape of the high brightness image area is the same. Accordingly, the high brightness image areas satisfying the conditions are treated to correspond to the pair lamp. The high brightness image area which cannot correspond to the pair lamp is treated as a single lamp. In a case where the pair lamp is prepared, a distance to the pair lamp is calculated by the pair lamp distance calculation processing of step S42. The distance between the right and left head lamps and the distance between the right and left tail lamps of the vehicle can be approximated a fixed value $w_O$ (for example, a degree of 1.5 m). On the other hand, since the focal distance f of the imaging lens 204 in the imager 200 is known, by calculating the distance w1 between the right and left lamps on the image sensor 206 of the imager 200, it is possible to obtain the actual distance x to the pair lamp by the simple proportion calculation ($x=f \times w0/w1$). Note that distance detection to the preceding vehicle or oncoming vehicle may use an exclusive distance sensor such as a laser radar or millimeter wave radar.

In step S5, a ratio of the red color image of the vertical polarization component P and the white color image of the vertical polarization component P is used as spectral information, and lamp type discrimination processing that discriminates whether the two high brightness image areas as the pair lamp depend on the light of the head lamp or depend on the light of the tail lamp is executed. The lamp type discrimination processing is executed as described below. In regard to the high brightness image area as the pair lamp, the red color comparison image in which the ratio of the pixels data corresponding to the imaging pixels a and d on the image sensor 206 and the pixel data corresponding to the imaging pixel b on the image sensor 206 is assumed the pixel value is first prepared in step S51. Then, in step S52, the pixel value of the red color comparison image is compared with the predetermined threshold value, the high brightness image area of a value larger than the predetermined threshold value is determined to be a tail lamp image area depending on the light from the tail lamp, and the high brightness image area of a value lesser than the predetermined threshold value is determined to be a head lamp image area depending on the light from the head lamp.

Subsequently, by using the difference polarization degree ((S−P)/(S+P)) as the polarization information with respect to each image area discriminated as the tail lamp image area and the head lamp image area, reflection discrimination processing discriminating the direct light from the tail lamp or the head lamp or reflection light received by being reflected on the mirror surface such as the rain road surface and so on is executed in step S6. In the reflection discrimination processing, in step S61, the difference polarization degree ((S−P)/(S+P)) with respect to the tail lamp image area is first calculated, the difference polarization degree image in which the difference polarization degree is the pixel value is prepared. Similarly, the difference polarization degree ((S−P)/(S+P)) even with respect to the head lamp image area is calculated, the difference polarization degree image that regards the difference polarization degree as the pixel value is prepared. Then, in step S62, the pixel value of each of the difference polarization degree images is compared with the predetermined threshold, and determined to be depended on the reflection light in regard to the image area of the tail lamp and the image area of the head lamp each having a pixel value more than the predetermined threshold. As a result, these image areas are processed to be deleted assuming that the tail lamp of the preceding vehicle is not projected or the head lamp of the oncoming vehicle is not projected. It is discriminated that the tail lamp of the preceding vehicle is projected or the head lamp of the oncoming vehicle is projected by remaining image areas of the tail lamp and the head lamp, in which the deleted processing is executed.

Note that a rain sensor and so on are previously mounted on the vehicle, and the foregoing reflection light discrimination processing S6 may be executed only a case where rain and so on is detected by the rain sensor. Only a case where a driver operates a wiper, the foregoing reflection light discrimination processing S6 may be executed. In summary, only a case of raining at which the reflection light on the rain road surface is assumed, the forgoing reflection light discrimination processing S6 may be executed.

The detection result of the preceding vehicle and the oncoming vehicle detected by the vehicle detection processing as described above is used for the light distribution control of the head lamp which is the vehicle-mounted device of the own vehicle in the embodiment. Concretely, if the tail lamp is detected by the vehicle detection processing and the detected tail lamp approaches a range of distance where the illumination light of the head lamp of the own vehicle is incident, a part of light from the head lamp of the own vehicle is controlled to be shielded, or a light emitting direction of light from the head lamp of the own vehicle is controlled to be offset upward and downward and rightward and leftward such that the illumination light of the head lamp of the own vehicle does not illuminate the preceding vehicle. In addition, if the head lamp is detected by the vehicle detection processing and the detected head lamp approaches a range of distance where the illumination light of the head lamp of the own vehicle illuminates a driver of the oncoming vehicle, a part of light from the head lamp of the own vehicle is controlled to be shielded, or a light emitting direction of light from the head lamp of the own vehicle is controlled to be offset upward and downward and rightward and leftward such that the illumination light of the head lamp of the own vehicle does not illuminate the oncoming vehicle.

White Line Detection Processing

White line detection processing in the embodiment is described hereinafter. In the embodiment, processing that detects a white line (division line or mark line) as the detection object is executed for the purpose of preventing the own vehicle from deviating from a possible travelling area. Here, the white line includes all of white lines of solid line, broken line, dotted line, and double line that divide a road. Note that a division line such as a yellow line of color other than the white line can be similarly detected.

In the white line detection processing in the embodiment, of the information which can be acquired from the imaging assembly 101, the polarization information of the vertical polarization component P of the white color component (non-spectrum) is used. Note that a vertical polarization component of cyan light may be added to the vertical polarization component P of the white color component. Generally, it is known that the white line or the asphalt surface has a flat spectral brightness characteristic in a visible light area. On the other hand, it is suitable to image the asphalt surface or the white line, since the cyan light has a wide range in the visible light area. Accordingly, by using the optical filter 205 in the second example of configuration and including the vertical polarization component of the cyan light in the vertical polarization component of the white color component, and hence resolution is improved, thereby enabling even a far white line to detect, since the number of the used imaging pixels increases.

In the white line detection processing in the embodiment, a white line is formed on a road surface of a color close to a black color in many roads. In the image of the vertical polarization component P of the white color component (non-spectrum), the brightness of the white line portion is sufficiently larger than the other portion on the road surface. Therefore, the white line can be detected by determining a portion of the road surface having brightness more than the predetermined value as the white line. In particular, in the embodiment, since the horizontal polarization component S of the image of the vertical polarization component P of the used white color component (non-spectrum) is cut, it is possible to acquire an image in which reflection light on rain road is eliminated. Consequently, it is possible to execute the detection of the white line without erroneously recognizing disturbance light such as reflection light of the head lamp on the rain road to be the white line in the night.

In addition, the white line detection processing in the embodiment, of the information which can be acquired from the imaging assembly 101, the polarization information by the comparison of the horizontal polarization component S and the vertical polarization component P of the white color component (non-spectrum), for example, the difference polarization degree ((S−P)/(S+P)) of the horizontal polarization component S and the vertical polarization component P of the white color component (non-spectrum) may be used. Because the reflection light from the white line usually includes a dominant scattering reflection component, the vertical polarization component P and the horizontal polarization component S of the reflection light are approximately the same, and the difference polarization degree has a value close to zero. On the other hand, the asphalt surface where the white line is not provided has a dominant mirror reflection component, and the difference polarization degree has a further large value. Accordingly, it can be determined that a portion where the acquired polarization difference value of the road surface is smaller than the predetermined threshold is the white line.

Rain Drop Detection Processing on Windshield

Rain drop detection processing in the embodiment is described below. In the embodiment, processing that detects rain drop as adhered substance is executed for the purpose performing drive control of the wiper 107 or discharge control of washer liquid. Here, although a case where adhered substance adhered to the windshield is rain drop is described hereinafter as one example, adhered substances such as bird's dropping, spray of water on the road flying from adjacent vehicle or the like are similarly handled.

In the rain drop detection processing in the embodiment, of the information which can be acquired from the imaging assembly 101, the polarization information of the vertical polarization component P of the extraneous substance detecting image area 214 that receives light transmitting the infrared light-transmitting filter area 212 of the pre-stage filter 210 is used. It is, therefore, necessary that light guided from the light source device 202 into the windshield 105 includes much vertical polarization component P. For this, for example, a case where a light-emitting diode (LED) is used as a light source of the light source device 202, a polarizer that transmits only the vertical polarization component P may be disposed between the light source device 202 and the windshield 105. On the other hand, a case where a semiconductor laser (LD) is used as a light source of the light source device 202, because the LD can emit only light of particulate polarization component, an axis of the LD may be aligned such that light of only the vertical polarization component P is entered the windshield 105.

Figure 18:
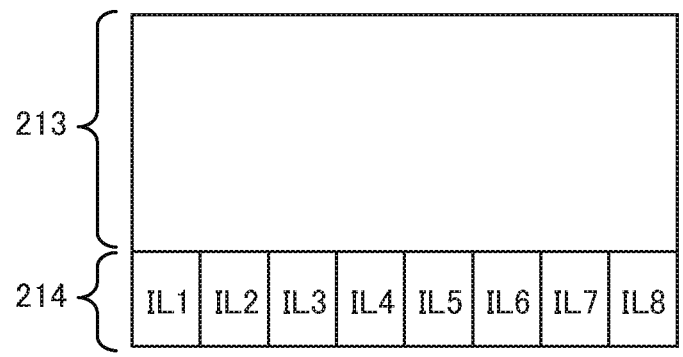
FIG. 18 is an explanatory view of rain drop detection processing in the embodiment.

In the embodiment, as described above, the illumination light (infrared light) emitted from the light source device 202 and entered the inner wall surface of the windshield 105 through the reflection polarization prism 230 is regularly reflected on the outer wall surface of the windshield 105 in a non-adhesion portion where the rain drop is not adhered on the outer wall surface of the windshield 105. The regular reflection light is received on the extraneous substance detecting image area 214 of the image sensor 206 to be projected thereon. On the other hand, in a rain-drop adhesion portion where the rain drop is adhered on the outer wall surface of the windshield 105, the illumination light transmits the outer wall surface of the windshield 105, and there is no possibility that the transmitted light is received with the extraneous substance detecting image area 214 of the image sensor 206. Accordingly, the extraneous substance detecting image area 214 of the imaged image data has a high brightness image portion (high pixel value) in regard to the non-adhesion portion, while has a low brightness image portion (low pixel value) in regard to the rain-drop adhesion portion. For this difference, it is possible to grasp not only the presence or absence of the rain drop, but also a quantity of raindrop FIG. 18 is an explanatory view of the rain drop detection processing in the embodiment. In the rain drop detection processing in the embodiment, the information of the extraneous substance detecting image area 214 of the imaged image data acquired from the imaging assembly 101 is used, if it is determined that the quantity of the rain drop exceeds a fixed quantity, the wiper 107 is driven. More specifically, the extraneous substance detecting image area 214 is divided, for example, in eight sections in a lateral direction of the image, as shown in FIG. 18, and the total pixel value IL1 to IL8 in each section are calculated. If the total pixel value IL1 to IL8 in either section is smaller than a predetermined threshold ILth, it is determined that the quantity of the rain drop exceeds a fixed quantity, the wiper 107 is driven. On the contrary, if the total pixel value IL1 to IL8 in either section is larger than a predetermined threshold ILth, the drive of the wiper 107 is stopped. Note that conditions that initiate and stop the drive of the wiper 107 can be optionally set, without being limited to the above. For example, it is not necessary that the threshold is a fixed value, and may suitably change depending on change in situation around the own vehicle on which the imager 200 is mounted. In addition, thresholds of the initial condition and the stop condition are the same value or different values.

Here, even if the configuration in which the disturbance light is reduced by providing the optical filter 205 is adopted, as shown in the embodiment, because disturbance light (disturbance light having the same wavelength as a light-emitting wavelength of light from the light source device 202) also exists, it is not possible to completely delete the influence of the disturbance light. For example, infrared wavelength component of the sunlight influences as disturbance light in day and infrared wavelength component contained in light of the head lamp of the oncoming vehicle influences as disturbance light in night. If the disturbance light exists, the total pixel value IL1 to IL8 in each section increases by a quantity of the disturbance light to generate an error, and hence erroneous detection causes suitable control for detecting the rain drop to interrupt.

To prevent the erroneous detection, in the embodiment, light quantity of the illumination light emitted from the light source device 202 is controlled by synchronizing the light quantity with exposure light of the image sensor 206. Concretely, an illumination-time image which is an image at the time when illuminating with the light source device 202 and a turning off-time image which is an image at the time when turning-off the light source device 202 are imaged. A difference image (comparison image) between these images with respect to the extraneous substance detecting image area 214 is then created, and the foregoing rain drop detection processing is executed based on the difference image.

Of the disturbance light, the sunlight and so on do not significantly change, even if some times pass. However, there is case that the headlight of the travelling oncoming vehicle facing the own vehicle and so on significantly change even if a little time passes. In this case, if there are set time intervals of two frames to obtain the difference image, there is possibility that magnification of the disturbance light changes between the time intervals, the disturbance light cannot be effectively cancelled when the difference image is created. To prevent this problem, it is preferable to form the two frames to obtain the difference image in a continuous frame.

Moreover, in the embodiment, in a usual frame imaged to use the image information of the front sensing image area 213, automatic exposure control is executed based on a brightness value of the front sensing image area 213 and the light source device 202 remains turned off. The two frames for rain drop detection are continuously inserted at any time imaging the usual frame. In imaging the two frames, the exposure control suitable to the rain drop detection is executed without the automatic exposure control of the usual frame executed in imaging.

If the vehicle control, the light distribution control and so on are executed based on the image information of the front sensing image area 213, the automatic exposure control (AEC) complying with the brightness value of the central portion of the imaged image is normally executed. However, in regard to the two frames, it is preferable to execute optimum exposure control for the rain drop detection. This is because an exposure time changes in the frame at the time of illumination of the light source device 202 and the frame at the time of lighting-off of the light source device 202, if the automatic exposure control is executed even in imaging the two frames to detect the rain drop. Also, this depends on the following reason. If the exposure time changes between the two frames, a light-receiving quantity of the disturbance light contained each frame changes and there is possibility that the disturbance light can be suitably cancelled by the difference image. As a result, in regard to the two frames to detect the rain drop, for example, the exposure control in which the exposure time is the same may be executed.

The rain drop detection processing may be executed by using the same imaging frame as the usual frame without using the frame for the rain drop detection. On the other hand, the rain drop detection processing may be executed by a single frame without using the foregoing difference image.

Figure 19:
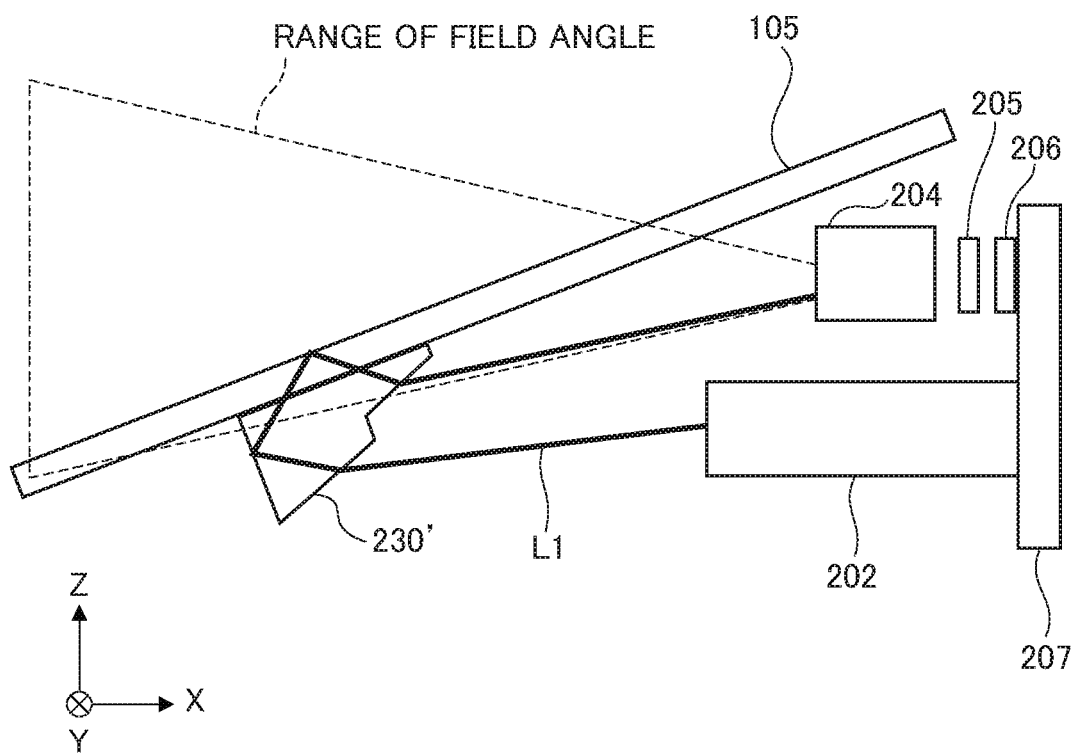
FIG. 19 is an explanatory view showing a schematic configuration of one example of the imaging assembly using a conventional reflection polarization prism.

Next, the wavelength filter 209 as an optical member provided in the imaging assembly 101 is described. FIG. 19 is an explanatory view showing schematic configuration of one example of the imaging assembly using a conventional reflection polarization prism 230'. As shown in FIG. 19, in the conventional configuration, illumination light emitted from the reflection polarization prism 230' is directly entered the imaging lens 204. In such a configuration, the reflection polarization prism 230' gets in a range of field angle (visibility angle) of the imaging lens 204. In this case, the reflection polarization prism 230' interrupts a part of light flux from the imaging area in the front of the vehicle toward the image sensor 206. At this time, if the reflection polarization prism 230' is disposed in a position as far from the imaging lens 204 as possible, it is possible to reduce the light flux quantity interrupted by the reflection polarization prism 230'. However, to sufficiently reduce the light flux quantity interrupted by the reflection polarization prism 230', a distance between light flux quantity interrupted by the reflection polarization prism 230' and the imaging lens 204 is long too much, a length in a front-back direction becomes significantly long, thereby increasing a size of the imaging assembly.

Figure 20:
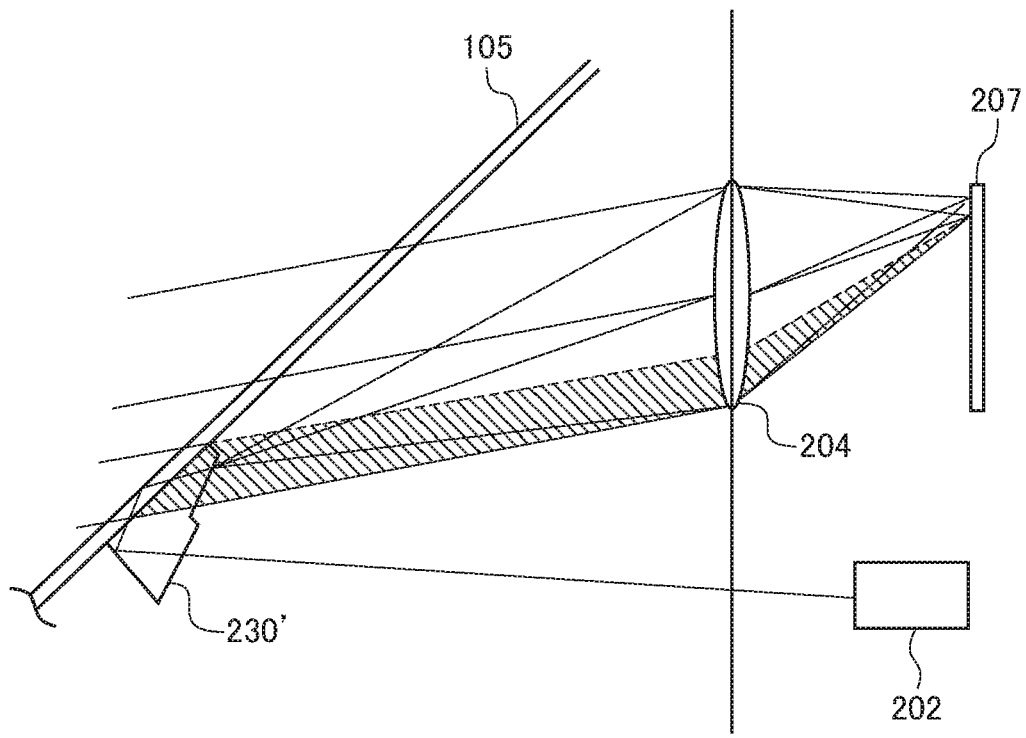
FIG. 20 is an explanatory view showing light flux toward a vicinity of an upper end of the front sensing light receiving area of the image sensor from the imaging area in a front of a vehicle and light flux of illumination light emitted from the reflection polarization prism, in the imaging assembly.

FIG. 20 is an explanatory view showing the light flux from the imaging area in the front of the vehicle toward a vicinity of the upper end of the front sensing light receiving area of the image sensor 206 and the light flux of the illumination light emitted from the reflection polarization prism 230'. In the embodiment, for the characteristic of the imaging lens 204, because the scene in the imaging area and the image on the image sensor 206 are arranged to be an upside down state, the extraneous substance detecting light-receiving area is positioned in an upper portion and the front sensing light receiving area is positioned in a lower portion, on the image sensor 206.

The light flux emitted from a position on the imaging area and entered the an effective range of the imaging lens is focused on a corresponding position on the front sensing light receiving area of the image sensor 206 by the imaging lens 204. However, the light flux from the imaging area focused on a portion (portion close to the upper end of the front sensing light receiving area) close to extraneous substance detecting light-receiving area, of the front sensing light receiving area of the image sensor 206 is partially interrupted by the reflection polarization prism 230' before entering the imaging lens 204. Concretely, a portion of the light flux entered the lower portion of the imaging lens 204 is interrupted by the reflection polarization prism 230'.

Therefore, the light receiving quantity of a portion (a vicinity of the upper end of the front sensing light receiving area) of the front sensing light receiving area, where a part of the light flux is interrupted by the reflection polarization prism 230' is relatively small, compared to the light receiving quantity of a portion (the lower portion of the front sensing light receiving area) of the front sensing light receiving area of the image sensor 206 separated from the extraneous substance detecting light-receiving area, where a part of the light flux is not interrupted by the reflection polarization prism 230'. The quantity of the light flux interrupted by the reflection polarization prism 230' becomes large as approaching the extraneous substance detecting light-receiving area.

Figure 21:
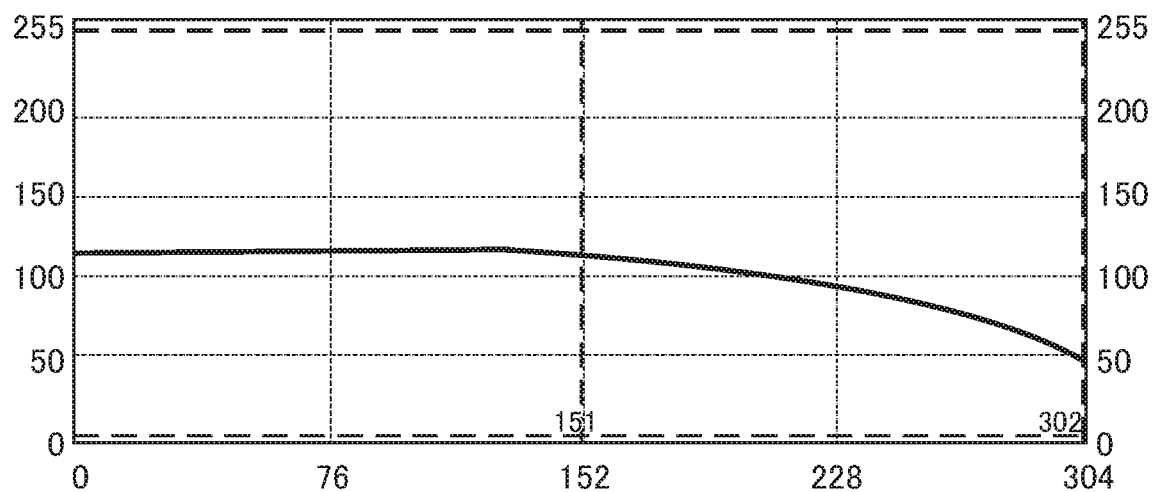
FIG. 21 is a graph showing a relationship between brightness of a front sensing image area when incorporating even light from the imaging area in the imager and an upward and downward position of the front sensing image area, in the imaging assembly.

FIG. 21 is a graph showing a relationship between the brightness of the front sensing image area 213 when incorporating even light from the imaging area in the imager 200 and the upward and downward position of the front sensing image area 213, in the imaging assembly. In the graph, the horizontal axis shows the upward and downward position of the front sensing image area 213 and the vertical axis shows a brightness value. The horizontal axis shows to approach the extraneous substance detecting image area 214 as going to a right side in the drawing. That is to say, the horizontal axis shows directing to a lower portion of the image as going to the right side. The brightness value should become originally the same at any position in upward and downward direction of the front sensing image area 213, excluding the characteristic of the lens or sensor. However, as shown in the graph of FIG. 21, in a right side portion of the graph, the brightness value is reduced as going to the right side. This results in that the quantity of the light flux interrupted by the reflection polarization prism 230', of the light flux received by the front sensing light receiving area of the image sensor 206 becomes large as approaching the extraneous substance detecting light-receiving area.

In this way, in the lower portion of the front sensing image area 213, if the brightness value is reduced as going to the lower side of the image (as approaching the extraneous substance detecting image area 214), there is a problem in that the detection accuracy of the other vehicle or the white line and so on in the lower portion of the front sensing image area 213 is reduced.

In the embodiment, as shown in FIG. 3, the provision of the wavelength filter 209 on the imaging assembly 101 makes it possible to dispose the reflection polarization prism 230 outside of the range of field angle. In other words, in the embodiment, the wavelength filter 209 disposed throughout the range of field angle of the imaging lens 204 is configured by the cut filter shown in FIG. 5 or the bandpass filter shown in FIG. 6 similar to the infrared light transmitting filter area 212 of the optical filter 205. Thereby, the light of the visible light area of the light introduced from the imaging area in the front of the vehicle transmits the wavelength filter 209, and is focused onto the front sensing image area 213 of the image sensor 206 by the imaging lens 204. On the other hand, the wavelength filter 209 in the embodiment does not transmit and reflects light of the infrared wavelength range which is the same wavelength range as the illumination light from the light source device 202. Therefore, on a surface where the visible light introduced from the imaging area in the front of the vehicle is emitted from the wavelength filter 209, the illumination light reflected on the non-adhesion portion on the outer wall surface of the wind shield 105 is reflected, it is possible to incorporate this reflection light into the extraneous substance detecting light-receiving area of the image sensor 206.

With the configuration, as shown in FIG. 3, a position where the light flux from the imaging area is not interrupted, that is to say, even if the reflection polarization prism 230 is disposed outside of the range of field angle, it is possible to focus the reflection light reflected on the windshield 105 onto the reflection polarization prism 230 of the extraneous substance detecting light-receiving area of the image sensor 206 through the wavelength filter 209 in the range of field angle. As a result, the fact that the light receiving quantity from the imaging area is relatively reduced in the front sensing light receiving area does not occur, because the light flux from the imaging area received on the front sensing image area 213 of the image sensor 206 is not interrupted by the reflection polarization prism 230.

In addition, in the embodiment, if the illumination light which is guided in the windshield 105 by the reflection polarization prism 230 and reflected on the outer wall surface of the windshield 105 can be reflected on an inner surface 209a of the wavelength filter 209 and entered the front sensing light receiving area of the image sensor 206, the reflection polarization prism 230 may be disposed on any position of the inner wall surface of the windshield 105. Accordingly, a high freedom with respect to the disposition of the reflection polarization prism 230 can be acquired. In addition, by acquiring the high freedom of the disposition of the reflection polarization prism 230, a high freedom of the position of the rain drop detection area set on the windshield 105 can be acquired. Consequently, it is possible to set the rain drop detection area on a position on the windshield 105 better effective to the rain drop detection.

Meanwhile, in the embodiment, by employing a difference of wavelength between the light to be received onto the front sensing light receiving area of the image sensor 206 from the imaging area and the illumination light, the light from the imaging area is adapted to receive with the front sensing light receiving area of the image sensor 206 and the reflection light reflected on the outer wall surface of the windshield 105 is adapted to receive with the front sensing light receiving area of the image sensor 206, by the wavelength filter 209. However, the optical member to dispose the reflection polarization prism 230 outside of the range of field angle of the imaging lens 204 is not limited to the wavelength filter 209 that employs the difference of wavelength.

For example, instead of the wavelength filter 209 in the embodiment, a polarization filter as a polarization component selecting member may be used. The polarization filter reflects a particulate polarization component (for example, the horizontal polarization component S) contained in the illumination light from the light source device 202 and transmits light of other polarization component (for example, the vertical polarization component P) different from the particulate polarization component. In this case, it is possible to acquire the same advantageous effect as in the wavelength filter 209.

The foregoing embodiment has been described as one example. Several modes of the present invention and advantageous effects according to the modes are further described as follows.

(Mode A)

An imaging device includes a light emitter such as a light source device 202, an illumination light guiding member such as a reflection polarization 230, an imager 200, and an optical member such as a wavelength filter 209. The light emitter irradiates a light-transmitting member such as a windshield 105 of a vehicle with illumination light from one surface (inner wall surface) of the light-transmitting member. The illumination light guiding member includes an incident surface 232 where the illumination light emitted from the light emitter is entered and a transmission surface 231 that is disposed in contact with the one surface of the light-transmitting member and passes the illumination light introduced from the incident surface through the one surface of the light-transmitting member. The imager receives light from a predetermined imaging area such as a front of an own vehicle that transmits the light-transmitting member with a first light-receiving portion such as a front sensing light receiving area of an image sensor 206 to output image data of the imaging area and receives the illumination light reflected on an opposite surface (outer wall surface and so on) to the one surface with a second light-receiving portion such as an extraneous substance detecting light-receiving area adjacent to the first light-receiving portion to output image data of the light-transmitting member. The optical member emits light introduced from the predetermined imaging area to the first light-receiving portion of the image sensor and emits the illumination light reflected on the opposite surface of the light-transmitting member to the second light-receiving portion of the image sensor. With the configuration, the optical member makes it possible to receive the illumination light reflected on the opposite surface of the light-transmitting member with the second light-receiving portion of the image sensor even if the illumination light guiding member is disposed outside a range of field angle of the imager. Thereby, as described above, the light from the imaging area received with the first light-receiving portion of the image sensor is not interrupted by the reflection polarization prism 230. As a result, it can be restrained that a light-receiving quantity from the imaging area is relatively reduced at an area of the first light-receiving portion close to the second light-receiving portion of the image sensor.

(Mode B)

In the mode A, the optical member is disposed on a light path in which the light emitted from the predetermined imaging area and transmitting the light-transmitting member is received onto the image sensor, the light introduced from the predetermined imaging area is transmitted and emitted from a predetermined exit surface such as an inner surface 209a toward the first light-receiving portion of the image sensor, and the illumination light reflected on the opposite surface of the light-transmitting member is reflected on the predetermined exit surface to emits toward the second light-receiving portion of the image sensor. With the configuration, a freedom of the disposition of the illumination light guiding member is improved.

(Mode C)

In the mode B, the light emitter emits illumination light of a particulate wavelength range out of a visible light wavelength range, and the optical member is a wavelength selecting member such as the wavelength filter 209 which transmits light of the visible light wavelength range introduced from the predetermined imaging area and reflects light of the particulate wavelength range on the predetermined exit surface. With the configuration, it is possible to easily realize an optical member using a difference of wavelengths.

(Mode D)

In the mode C, the imaging device further includes a wavelength filter such as an infrared light cut filter area 211 which is disposed on a light path that is incident on the first light receiving portion of the image sensor and transmits light of the visible light wavelength range, but does not transmit light of the particulate wavelength range. With the configuration, the illumination light from the light emitter reflected on the exit surface of the optical member is prevented from entering the first light-receiving portion of the image sensor, thereby making it possible to restrain disturbance light to the first light-receiving portion of the image sensor.

(Mode E)

In the mode C or D, the imaging device further includes a wavelength filter such as an infrared light transmitting filter area 212 which is disposed on a light path that is incident on the second light receiving portion of the image sensor and transmits light of the particulate wavelength range, but does not transmit light of the visible light wavelength range. With the configuration, the light from the imaging area that transmits the optical member is prevented from entering the second light-receiving portion of the image sensor, thereby making it possible to restrain disturbance light to the second light-receiving portion of the image sensor.

(Mode F)

In any one of the modes B to E, the light emitter emits illumination light having a particulate polarization component, and the optical member is a polarization component selecting member which transmits light of other polarization component such as a vertical polarization component P different from the particulate polarization component and reflects light of the particulate polarization component on the predetermined exit surface. With the configuration, it is possible to easily realize an optical member using a difference of polarization characteristics.

(Mode G)

In the mode F, the imaging device further includes a polarization filter which is disposed on a light path that is incident on the first light receiving portion of the image sensor and transmits light of the other polarization component, but does not transmit light of the particulate polarization component. With the configuration, the illumination light from the light emitter reflected on the exit surface of the optical member is prevented from entering the first light-receiving portion of the image sensor, thereby making it possible to restrain disturbance light to the first light-receiving portion of the image sensor.

(Mode H)

In the mode F or G, the imaging device further includes a polarization filter which is disposed on a light path that is incident on the second light receiving portion of the image sensor and transmits light of the particulate polarization component, but does not transmit light of the other polarization component. With the configuration, the light from the imaging area transmitting the optical member is prevented from entering the second light-receiving portion of the image sensor, thereby making it possible to restrain disturbance light to the second light-receiving portion of the image sensor.

(Mode I)

An object detector includes an imaging device such as an imaging assembly 101 that receives light from an imaging area, which is introduced from one surface (inner wall surface) of a light-transmitting member such as a windshield 105 and transmits the light-transmitting member and that images an image (front sensing image area 213) of the imaging area and that images an image (extraneous substance detecting image area 214) of an opposite surface (outer wall surface) to the one surface of the light-transmitting member, and an object detector including a detection processor 102A such as an image analyzer 102 that executes object detection processing to detect a detection object existing in the imaging area and extraneous substance detection processing to detect extraneous substance adhered onto the opposite surface of the light-transmitting member, based on the image data imaged by the imaging device. The imaging device according to any one of the modes A to H is used as the foregoing imaging device. With the configuration, even if the extraneous substance such as the rain drop is detected from the image (extraneous substance detecting image area 214 and so on) of the light-transmitting member based on the light-receiving quantity received with the second light-receiving portion adjacent or close to the first light-receiving portion of the image sensor, it is restrained that the light-receiving quantity from the imaging area in an area of the first light-receiving portion close to the second light-receiving portion of the image sensor is relatively reduced. Thereby, it is possible to obtain a high accurate image data of the imaging area and improve processing accuracy in the post-processing using the high accurate image data of the imaging area.

(Mode J)

A mobile device control system includes an object detector that detects a detection object existing in an imaging area outside a moving body such as an own vehicle 100 based on image data imaged by an imaging device mounted on an inner wall surface of a window member such as a windshield 105 of the moving body and that detects an extraneous substance adhered onto an outer wall surface of the window member, and a mobile device controller such as a wiper controller 106, a head lamp controller 103, a vehicle travelling controller 108 or the like that controls a predetermined device to be controlled such as a wiper, a head lamp, a steering wheel, a brake and so on mounted on the moving body based on a detection result of the object detector. The object detector according to the mode I is used as the foregoing object detector. With the configuration, it is possible to accurately control the control device on the moving body, because the control device on the moving body can be controlled by use of the high accurate image data of the imaging area.

Although several embodiments of the present invention have been described, it should be noted that the present invention is not limited to these embodiments, various changes and modifications can be made to the embodiments.

REFERENCE SIGNS LIST 100 own vehicle
101 imaging assembly
102 image analyzer
102A detection processor
102B light source controller
103 head lamp controller
104 head lamp
105 windshield
106 wiper controller
107 wiper
108 vehicle travelling controller
200 imager
202 light source device
204 imaging lens
205 optical filter
206 image sensor
207 sensor substrate
208 signal processor
209 wavelength filter
210 pre-stage filter
211 infrared light cut filter area
212 infrared light-transmitting filter area
213 front sensing image area
214 extraneous substance detecting image area
220 post-stage filter
221 filter substrate
222 polarizing filter layer
223 spectral filter layer
230, 230' reflection polarization prisms
231 transmission surface
232 incident surface
233 exit surface

The invention claimed is:

1. An imaging device comprising:
   a light emitter configured to irradiate a light-transmitting member with illumination light from an inner surface of the light-transmitting member, the light-transmitting member having the inner surface and an outer surface;
   an illumination light guiding member including an incident surface and a transmission surface, the incident surface facing the light emitter and the transmission surface being in contact with the inner surface of the light-transmitting member such that the incident surface is configured to receive the illumination light emitted from the light emitter and the transmission surface is configured to pass the illumination light through the inner surface of the light-transmitting member;
   an imager including an image sensor configured to perform a sensing operation and a signal processor configured to output image data based on the sensing operation, the image sensor being behind the inner surface of the light-transmitting member, the image sensor including,
    a first light-receiving portion configured to receive light from a imaging area in front of the outer surface of the light-transmitting member that penetrates through the outer surface of the light-transmitting member and exits the inner surface of the light-transmitting member, and
    a second light-receiving portion configured to receive the illumination light emitted by the light emitter from behind the inner surface of the light-transmitting member and reflected on the outer surface of the light-transmitting member; and
an optical member configured to,
    direct the light from the imaging area in front of the outer surface of the light-transmitting member to the first light-receiving portion of the image sensor, and
    direct the illumination light emitted by the light emitter from the inner surface of the light-transmitting member and reflected on the outer surface of the light-transmitting member to the second light-receiving portion of the image sensor.

2. The imaging device according to claim 1, wherein the optical member is on a light path in which the light emitted from the imaging area that penetrates through the light-transmitting member is received onto the image sensor, and the optical member is configured to,
    emit the light introduced from the imaging area that penetrates through the light-transmitting member to the transmission surface of the illumination light guiding member and emitted from an exit surface of the illumination light guiding member toward the first light-receiving portion of the image sensor, and
    emit the illumination light emitted by the light emitter from the inner surface of the light-transmitting member and reflected on the outer surface of the light-transmitting member and reflected on the exit surface to the second light-receiving portion of the image sensor.

3. The imaging device according to claim 2, wherein the light emitter is configured to emit illumination light from the inner surface of the light-transmitting member of a particulate wavelength range out of a visible light wavelength range, and
the optical member is a wavelength selecting member configured to,
    transmit light of the visible light wavelength range introduced from the imaging area towards the first light-receiving portion of the image sensor, and
    reflect light of the particulate wavelength range emitted by the light emitter from the inner surface of the light-transmitting member such that the optical member reflects the light of the particulate wavelength range on the exit surface of the illumination light guiding member.

4. The imaging device according to claim 3, further comprising:
a wavelength filter on a light path that is incident on the first light-receiving portion of the image sensor, the wavelength filter configured to,
    transmit light of the visible light wavelength range to the first light-receiving portion of the image sensor, and
    block transmission of light of the particulate wavelength range to the first light-receiving portion of the image sensor.

5. The imaging device according to claim 3, further comprising:
a wavelength filter on a light path that is incident on the second light-receiving portion of the image sensor, the wavelength filter configured to,
    transmit light of the particulate wavelength range to the second light-receiving portion of the image sensor, and
    block transmission of light of the visible light wavelength range to receiving portion of the image sensor.

6. The imaging device according to claim 2, wherein the light emitter is configured to emit illumination light having a particulate polarization component, and
the optical member is a polarization component selecting member configured to,
    transmit light of other polarization component different from the particulate polarization component, and
    reflect light of the particulate polarization component on the exit surface.

7. The imaging device according to claim 6, further comprising:
a polarization filter on a light path that is incident on the first light-receiving portion of the image sensor, the polarization filter configured to,
    transmit light of the other polarization component to the first light-receiving portion of the image sensor, and
    block transmission of light of the particulate polarization component.

8. The imaging device according to claim 6, further comprising:
a polarization filter on a light path that is incident on the second light-receiving portion of the image sensor, the polarization filter configured to,
    transmit light of the particulate polarization component to the second light-receiving portion of the image sensor, and
    block transmission of light of the other polarization component.

9. An object detector comprising:
the imaging device of claim 1, the imaging device configured to,
    receive light from the imaging area, and image an image of the imaging area, and
    image an image of the outer surface of the light-transmitting member; and
a detection processor configured to,
    detect a detection object existing in the imaging area, and
    detect extraneous substance adhered onto the outer surface of the light-transmitting member, based on the image data imaged by the imaging device.

10. A mobile device control system, comprising:
the object detector of claim 9; and
a mobile device controller configured to control a device mounted on a moving body based on a detection result of the object detector.

\* \* \* \* \*